(12) United States Patent
Lee et al.

(10) Patent No.: US 11,546,350 B2
(45) Date of Patent: Jan. 3, 2023

(54) DATA PROVENANCE

(71) Applicant: QUALCOMM Incorporated, San Diego, CA (US)

(72) Inventors: Soo Bum Lee, San Diego, CA (US); Jay Rodney Walton, Waban, MA (US); John Wallace Nasielski, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 16/866,449

(22) Filed: May 4, 2020

(65) Prior Publication Data
US 2020/0358788 A1 Nov. 12, 2020

Related U.S. Application Data

(60) Provisional application No. 62/844,237, filed on May 7, 2019.

(51) Int. Cl.
*H04L 9/40* (2022.01)
*H04L 9/32* (2006.01)

(52) U.S. Cl.
CPC .......... *H04L 63/126* (2013.01); *H04L 9/3218* (2013.01); *H04L 9/3228* (2013.01);
(Continued)

(58) Field of Classification Search
CPC . H04L 63/126; H04L 9/3242; H04L 63/0281; H04L 9/3228; H04L 9/3218;
(Continued)

(56) References Cited

U.S. PATENT DOCUMENTS 9,117,095 B2* 8/2015 Klein ...................... G06F 21/80
10,311,240 B1* 6/2019 Nissler .................. H04L 9/0877
(Continued)

OTHER PUBLICATIONS

Ahmed I., et al., "Order Preserving Secure Provenance Scheme for Distributed Networks", Computers & Security, vol. 82, Dec. 21, 2018 (Dec. 21, 2018), pp. 99-117, XP085597324, ISSN: 0167-4048, DOI: 10.1016/J.COSE.2018.12.008, p. 106-p. 111.
(Continued)

*Primary Examiner* — Mohammed Waliullah
(74) *Attorney, Agent, or Firm* — Holland & Hart LLP

(57) ABSTRACT

Methods, systems, and devices for wireless communications are described. Aspects include a device generating data to be sent to a receiving device and determining to provide provenance for the data. The device may generate a data identifier based on an identifier generation key and encrypt the data using an encryption key generated from a key associated with an owner of the device. The device may sign they encrypted data transmission using a signing key where the signing key is based on the encrypted data and the data identifier. In some cases, the device may send the data to a receiving device via one or more proxy devices. In some cases, multiple device may send signed data transmissions to a proxy device and the proxy device may process the multiple data transmission and send the processed data to the receiving device. The receiving device may verify provenance of the data.

30 Claims, 13 Drawing Sheets

(52) U.S. Cl.
CPC ........ *H04L 9/3242* (2013.01); *H04L 63/0281* (2013.01); *H04L 63/20* (2013.01)

(58) Field of Classification Search
CPC ... H04L 63/20; H04L 67/12; H04L 2209/805; H04L 9/0866; H04L 9/088; H04L 9/3221; H04L 9/3247; H04L 63/0428; H04L 63/0435; H04L 63/0838; H04L 63/0876; H04W 4/70; H04W 12/108; H04W 12/041; G06F 21/64
See application file for complete search history.

(56) References Cited

U.S. PATENT DOCUMENTS

| | | | |
|---|---|---|---|
| 2006/0089912 A1* | 4/2006 | Spagna | G06Q 30/00 705/51 |
| 2013/0103945 A1* | 4/2013 | Cannon | H04L 9/14 713/168 |
| 2014/0108805 A1* | 4/2014 | Smith | H04L 9/0825 713/176 |
| 2019/0044726 A1* | 2/2019 | Macieira | H04L 67/566 |
| 2020/0127834 A1* | 4/2020 | Westland | H04L 63/00 |
| 2020/0186360 A1* | 6/2020 | Chan | H04L 9/30 |
| 2021/0243028 A1* | 8/2021 | Song | H04L 9/0825 |

OTHER PUBLICATIONS

Haider I., et al., "Trustworthy and Privacy-Aware Sensing for Internet of Things", arxiv.org, Cornell University Library, 201 Olin Library Cornell University Ithaca, NY 14853, Aug. 28, 2018, arXiv: 1808.08549v1 [cs.CR], Aug. 26, 2018 (Aug. 26, 2018), XP080910891, pp. 1-30, p. 1-p. 8, p. 11-p. 15, p. 24-p. 27.
International Search Report and Written Opinion—PCT/US2020/031456—ISAEPO—dated Aug. 12, 2020.

* cited by examiner

DATA PROVENANCE

CROSS REFERENCE

The present Application for Patent claims the benefit of U.S. Provisional Patent Application No. 62/844,237 by LEE et al., entitled "DATA PROVENANCE," filed May 7, 2019, assigned to the assignee hereof, and expressly incorporated by reference herein.

BACKGROUND

The following relates generally to wireless communications, and more specifically to data provenance.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Devices, such as Internet of Things (IoT) devices may generate private data and a receiving device may use the private data from one or more devices. In some cases, a proxy device such as a data management system may act as an intermediate device that facilitates transfer of the private data from one or more devices to the receiving device. However, in cases were the data is transferred or stored in one or more intermediary device (e.g., data management system, cloud-based storage, etc.) the receiving device may have no way of verifying the provenance (e.g., authenticity and origin) of the data without trusting the intermediary devices. In some cases, the device producing the data may also want to control privacy of the data while still providing provenance of the transferred data.

SUMMARY

The described techniques relate to improved methods, systems, devices, and apparatuses that support data provenance. Generally, the described techniques provide for systems and processes for providing provenance (e.g., data authenticity and/or proof of origin) of data transferred or processed by multiple entities. The system may include one or more devices that collect, generate or produce data that is transmitted to one or more receiving entities. In some cases, the data may be transferred from a producing device to a receiving device via one or more proxy devices, such as a data management system or data storage (e.g., cloud-based storage). The proxy devices may be trusted and perform one or more processes on the data such as verifying the provenance of the data to a receiving device or using the received data to generate modified data (e.g., computed result). In some cases, the proxy devices may not be a trusted device and the proxy devices may interface with the producing devices to transfer or process secured data transmissions to the receiving devices.

In some cases, a device may generate an encrypted data using a first encryption key to produce an encrypted data package. The device may associate a data identifier (ID) with the encrypted data package to create a data transmission. In some examples, the device may sign the data transmission using a signing key. The device may send the signed data transmission to a receiving device, for example, via one or more proxy devices. In some cases, the receiving device may verify the provenance of the data by verifying the signature, decrypting the data package and evaluating the data ID. In this regard, a receiving device may verify the provenance of data even when the data has been transferred between or processed by untrusted intermediary devices.

A method of communication at a device is described. The method may include generating data at the device based at least in part on metadata associated with the device, determining that the device is to provide provenance information for data generated at the device and to be stored in a storage, where the determining is based on a configuration profile, generating a data identifier for the data based on an identifier generation key, generating an encryption key based on a key associated with an owner of the device, encrypting the data using the encryption key, and signing the data that includes the encrypted data and the data identifier using a signing key associated with the device.

An apparatus for communication at a device is described. The apparatus may include a processor, memory in electronic communication with the processor, and instructions stored in the memory. The instructions may be executable by the processor to cause the apparatus to generating data at the device based at least in part on metadata associated with the device, determine that the device is to provide provenance information for data generated at the device and to be stored in a storage, where the determining is based on a configuration profile, generate a data identifier for the data based on an identifier generation key, generate an encryption key based on a key associated with an owner of the device, encrypt the data using the encryption key, and sign the data that includes the encrypted data and the data identifier using a signing key associated with the device.

Another apparatus for communication at a device is described. The apparatus may include means for generating data at the device based at least in part on metadata associated with the device, means for determining that the device is to provide provenance information for data generated at the device and to be stored in a storage, where the determining is based on a configuration profile, generating a data identifier for the data based on an identifier generation key, generating an encryption key based on a key associated with an owner of the device, encrypting the data using the encryption key, and signing the data that includes the encrypted data and the data identifier using a signing key associated with the device.

A non-transitory computer-readable medium storing code for communication at a device is described. The code may include instructions executable by a processor to generate data at the device based at least in part on metadata associated with the device, determine that the device is to provide provenance information for data generated at the device and to be stored in a storage, where the determining is based on a configuration profile, generate a data identifier for the data based on an identifier generation key, generate an encryption key based on a key associated with an owner of the device, encrypt the data using the encryption key, and sign the data that includes the encrypted data and the data identifier using a signing key associated with the device.

Some examples of the method, apparatuses, and non-transitory computer-readable medium described herein may further include operations, features, means, or instructions for receiving a device configuration profile including a data generation policy, where the data may be generated at the device based as least in part on the data generation policy.

In some examples of the method, apparatuses, and non-transitory computer-readable medium described herein, the data generation policy includes a triggering condition for the device to obtain one or more data measurements used to generate the data.

Some examples of the method, apparatuses, and non-transitory computer-readable medium described herein may further include operations, features, means, or instructions for identifying one or more of: metadata, index data, a data type or a data label associated with the data, and generating the data identifier based on one or more of: the metadata, the index data, the data type or the data label.

In some examples of the method, apparatuses, and non-transitory computer-readable medium described herein, the data identifier uniquely identifies the data.

Some examples of the method, apparatuses, and non-transitory computer-readable medium described herein may further include operations, features, means, or instructions for computing a hash of one or more of: the identifier generation key, the metadata, the index data, the data type or the data label associated with the data, and generating the data identifier based on the computed hash.

In some examples of the method, apparatuses, and non-transitory computer-readable medium described herein, the identifier generation key may be a private key stored at the device.

In some examples of the method, apparatuses, and non-transitory computer-readable medium described herein, the encryption key may be a one-time key associated with the owner of the device.

Some examples of the method, apparatuses, and non-transitory computer-readable medium described herein may further include operations, features, means, or instructions for generating the identifier generation key at the device based on a keyed-hash function.

Some examples of the method, apparatuses, and non-transitory computer-readable medium described herein may further include operations, features, means, or instructions for receiving a device configuration profile including a security policy, where generating the identifier generation key may be based on the security policy, where the security policy including at least a service identifier, service type, service parameters and any combination thereof.

Some examples of the method, apparatuses, and non-transitory computer-readable medium described herein may further include operations, features, means, or instructions for generating a second data identifier for metadata associated with the data based on the identifier generation key, generating a second one-time encryption key based on the key associated with the owner of the device, and encrypting the metadata using the second one-time encryption key.

Some examples of the method, apparatuses, and non-transitory computer-readable medium described herein may further include operations, features, means, or instructions for signing a metadata transmission that includes the encrypted metadata and the second data identifier using the signing key, and transmitting the data transmission and the metadata transmission to the storage.

In some examples of the method, apparatuses, and non-transitory computer-readable medium described herein, the data may be associated with the metadata based on the identifier generation key.

Some examples of the method, apparatuses, and non-transitory computer-readable medium described herein may further include operations, features, means, or instructions for computing a hash of one or more of: a master credential, the identifier generation key, or a data type, and generating the encryption key based on the computed hash.

Some examples of the method, apparatuses, and non-transitory computer-readable medium described herein may further include operations, features, means, or instructions for receiving a device configuration profile including a security policy, where the security policy may be associated with the owner of the device, and generating the encryption key based on the security policy.

In some examples of the method, apparatuses, and non-transitory computer-readable medium described herein, at least one of the master credential or the identifier generation key may be private credentials associated with the key associated with the owner of the device.

Some examples of the method, apparatuses, and non-transitory computer-readable medium described herein may further include operations, features, means, or instructions for performing a digital water marking procedure on the data based on encrypting the data using the encryption key.

Some examples of the method, apparatuses, and non-transitory computer-readable medium described herein may further include operations, features, means, or instructions for identifying, at the device, a second data transmission associated with the data transmission, the second data transmission to be stored at the storage, where the second data transmission includes a second encrypted data and second data identifier, the second data transmission signed using the signing key, and receiving a request to verify that the second data transmission may be associated with the data transmission.

Some examples of the method, apparatuses, and non-transitory computer-readable medium described herein may further include operations, features, means, or instructions for performing a zero-knowledge proof (ZKP) procedure in response to receiving the request, where the ZKP procedure based on the identifier generation key.

In some examples of the method, apparatuses, and non-transitory computer-readable medium described herein, the identifier generation key remains private based on performing the ZKP procedure.

Some examples of the method, apparatuses, and non-transitory computer-readable medium described herein may further include operations, features, means, or instructions for identifying a device temporary private key associated with the device, and signing the data transmission using the device temporary private key.

In some examples of the method, apparatuses, and non-transitory computer-readable medium described herein, the device temporary private key may be based on a temporary device identification associated with the device.

In some examples of the method, apparatuses, and non-transitory computer-readable medium described herein, the temporary device identification may be based on a public key associated with the device.

In some examples of the method, apparatuses, and non-transitory computer-readable medium described herein, the signing the data transmission includes generating the signing key based at least in part a hash of the data and the data identifier.

Some examples of the method, apparatuses, and non-transitory computer-readable medium described herein may further include operations, features, means, or instructions for identifying, at the device, that the data and the data identifier may be to be transmitted to a proxy device, and transmitting the encrypted data and the data identifier to the proxy device.

Some examples of the method, apparatuses, and non-transitory computer-readable medium described herein may further include operations, features, means, or instructions for determining, at the device, that the proxy device may be a trusted device, and transmitting unsigned encrypted data and the data identifier to be signed by the proxy device.

Some examples of the method, apparatuses, and non-transitory computer-readable medium described herein may further include operations, features, means, or instructions for determining, at the device, that the proxy device may be not a trusted device, and transmitting the signed data transmission to the proxy device.

Some examples of the method, apparatuses, and non-transitory computer-readable medium described herein may further include operations, features, means, or instructions for generating the signing key based at least in part on a provisioned permanent key for the device.

DETAILED DESCRIPTION

Figure 1:
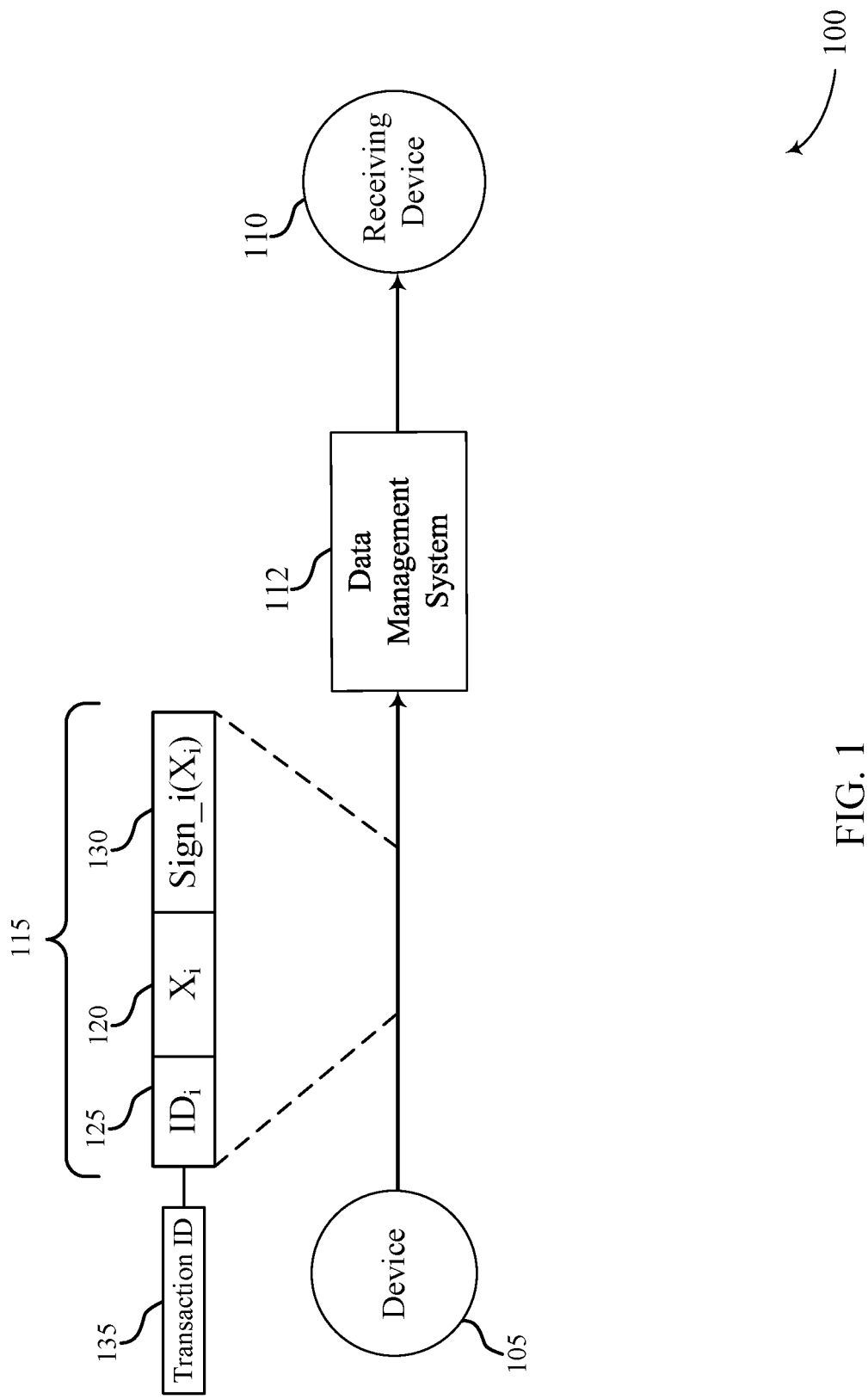
FIG. 1 illustrates an example of a data transfer system that supports data provenance in accordance with aspects of the present disclosure.

Various electronic devices such as mobile phones, smartphones, tablets, IoT devices, sensors, measurement devices, computer hardware, etc., may generate, collect or store data. In many cases, an electronic device may transmit the data through a network such as a wireless communication system, wired communication system or the like to one or more intermediary proxy devices such as a data management system. The proxy device may be operated and owner by a different entity from the device or receiving device. In some cases, the proxy device may transfer the data to receiving device. In other aspects, the proxy device may process, aggregate, generate new data, or the like and transmit the processed data to a receiving device. However, the receiving device may want to verify the provenance (e.g., authenticity or origin) of the data, which may be difficult to do if the receiving device does not trust the proxy device (e.g., they are controlled by different entities). In some cases, the device producing data may want to control the privacy of the data. For example, the producing device may want to conceal its identity while providing provenance. In some cases, the device may want to control privacy of the data, for example, by only providing part of the data or a processed data result to a receiving device while still providing provenance of the data.

Aspects of the disclosure include a device generating data to be sent to a receiving device. The device may encrypt the data using an encryption key (e.g., private encryption key) and generate a data identifier (ID) that is associated with the encrypted data. In some cases, the data ID may be generated from information associated with the data (e.g., metadata, data type, data index, data label, a private or public key, or the like). As such only a device that has access to an ID generation key may be able to verify or generate the data ID. The encrypted data and data ID may be signed by the device using a signature key. The signature key may be a private key associated with a device ID. In some cases, the signature may be verified by a public key of the device.

Aspects include one or more devices generating data and sending signed data transmissions to a proxy device. The proxy device may process one or more data transmissions, or the devices may interface with the proxy and participate in the data generation and signature processes. In some cases, the processed and signed data transmission may be sent via the proxy device to the receiving device. The receiving device may evaluate the signature or data ID to verify provenance of the data.

Aspects of the disclosure are initially described in the context of systems diagrams and a process flow for a data provenance system. Aspects of the disclosure and then described in the context of a wireless communications system. Aspects of the disclosure are further illustrated by and described with reference to apparatus diagrams, system diagrams, and flowcharts that relate to data provenance.

FIG. 1 illustrates an example of a data transfer system 100 that supports data provenance in accordance with aspects of the present disclosure. The data transfer system 100 may include a device 105, receiving device 110 and a data management system 112. The data transfer system 100 may also include a data transmission 115 from the device 105 to the receiving device 110, for example, via the data management system 112. The data transmission 115 may include a data package 120, a data ID 125 and a data signature 130. In some cases, the data transmission 115 may be associated with a transaction ID 135. The data transfer system 100 may illustrate aspects of the generation and transfer of data transmission 115 from the device 105 to the receiving device 110.

The device 105 may be an example of an electronic device that is configured to collect and store data in electronic form. The device 105 may be configured to receive and send data via wired or wireless transmission techniques, such as those described herein. In some examples, the device 105 may be one or more of a mobile device such as a smartphone, tablet, smart watch, medical device, sensor, or the like and collect data associated with using the device. In some cases, the device 105 may be one or more of an internet of things (IoT) device and may include one or more sensors, inputs, or other hardware for collecting or receiving data. In other cases, the device 105 may be a device that is configured to receive, transmit, store or otherwise process data.

The device 105 may operate (e.g., collect data, store data, apply privacy policy, apply security policy, transfer data, provide reports, or the like) according to one or more device configuration profiles. In some examples, the device may receive one or more configuration profiles, for example, from a management device, which may be associated with an owner of the device 105. The configuration profiles may include policies governing operation of the device 105. For example, the configuration profile may include a data collection policy that the device 105 may implement to collect data (e.g., frequency, triggering events, type of data to collect, duration, or the like). Additionally or alternatively, the configuration profiles may include a data management policy that the device 105 may implement as part of securing the data, maintaining privacy of the data, maintaining provenance of the data, transferring the data, or a combination thereof.

In some cases, the device 105 may be configured with an initial set of configuration/operating profiles. That is, the device may operate according to the initial set of profiles until a communication connection is established between the device 105 and a management device. In some cases, the initial set of configuration profiles may include one or more parameters for collecting data (e.g., frequency, triggers, type, etc.), security policies for managing data or communicating data, or the like. The device 105 may operate according to the initial set of configuration parameters until new or updated configuration profiles are received from a management system or management device.

The device 105 may identify data to be sent to the receiving device 110. The device 105 may encrypt the data to generate a data package 120. In some cases, the device may encrypt the data using an encryption key such as a private encryption key. Further, the encryption key may be kept secret or only shared with devices that have been authorized to access data contained in the data package 120. In some cases, the encryption key is kept separate from or not transmitted with the data package 120. In this regard, data contained within the data package 120 may remain inaccessible or be kept private from any device that does not have access to the encryption key. For example, if the data package 120 is sent to a server or storage (e.g., cloud-based storage, data center, or the like), those devices may not be able to determine the contents of the data package 120 without also receiving the encryption key.

The device 105 may associate a data ID 125 to the data package 120. In some cases, the data ID 125 may uniquely identify the data package 120 or the data transmission 115 including the data packet. For example, the device 105 may generate multiple data transmissions 115. In some cases, the device 105 may generate a first data ID 125 (e.g., $ID_i$) that identifies a first data package 120 (e.g., $X_i$). In this regard, each data package 120 may be uniquely identified by a data ID 125.

In some cases, the device 105 may sign the data transmission 115 (e.g., data package 120 and data ID 125) with a data signature 130. In some cases, the data signature 130 may be associated with a key such as a private key, certificate, or the like. In this regard, a holder of the public key may verify that the data transmission 115 including the data package 120 and the data ID is from the device 105. Further, the signature key used to generate the data signature 130 may be a private key or certificate that is different from the exertion key used to encrypt the data. As such, the key (e.g., public key) used to verify that the data was produced by the device 105 or sent from the device 105 may not decrypt or provide access to the data in the data package 120.

In some cases, the device 105 may generate the data transmission 115 including the data package 120 associated with the data ID 125 and signed by the data signature 130, and send the data transmission 115 to the receiving device 110. The receiving device 110 may be another electronic device (e.g., mobile device, IoT device, etc.), a server, a cloud-based storage device, other storage device, a proxy device, or the like. In some cases, the receiving device 110 may not have access to the encryption key used to generate the data package 120 or the signature key used to generate the data signature 130. As such, the receiving device 110 may be able to store the data transmission 115 without accessing the data or verifying the data signature 130. In some examples, the receiving device 110 may have access to the public key associated with the signature key. In these cases, the receiving device 110 may be able to verify that the data transmission (e.g., data package 120 and data ID 125) was generated by or transmitted by the device 105. In other cases, the receiving device may have access to the encryption key and be able to access the data but not verify that that is was sent by the device 105. In some examples, the receiving device 110 may have access to both the encryption key and the signature key and be able to verify the data was from the device 105 and access the data contained in the data package 120.

In some cases, a data management system 112 may manage the storage and transfer of the data transmission 115 from the device 105 to the receiving device 110. For example, the data management system 112 may be a cloud-based system and receiving the data transmission 115 from the device 105. The data transmission 115 may also be associated with a transaction identification (ID) 135 that is used by the data management system to verify the data transmission 115. For example, the data management system 112 may receive the data transmission 115 from the device 105 and the associated transaction ID 135. The data management system may verify the transaction ID 135, for example using a public key associated with the device 105. Upon verification of the transaction ID 135, the data management system 112 may store the data transmission 115 using the transaction ID 135 in a storage (e.g., cloud-based storage). In some, cases the data management system 112 may send the data transmission 115 to the receiving device 110. In some examples, the data management system 112 may not have access to the encrypted data 120. Further, the data management system 112 may access the data ID 125, but the data ID 125 may appear as random identifier to the data management system 112. For example, the data management system 112 may not have the information necessary to decode the data ID 125 (e.g., security key). As such, the data management system 112 may use the data ID 125 as an identifier of a data transmission. In this regard, the data management may determine that the data transmission is 115 is to be sent to the receiving device 110 based on the data ID 125. This may include the receiving device 110 requesting access to the data transmission 115 associated with the data ID 125.

Figure 2A:
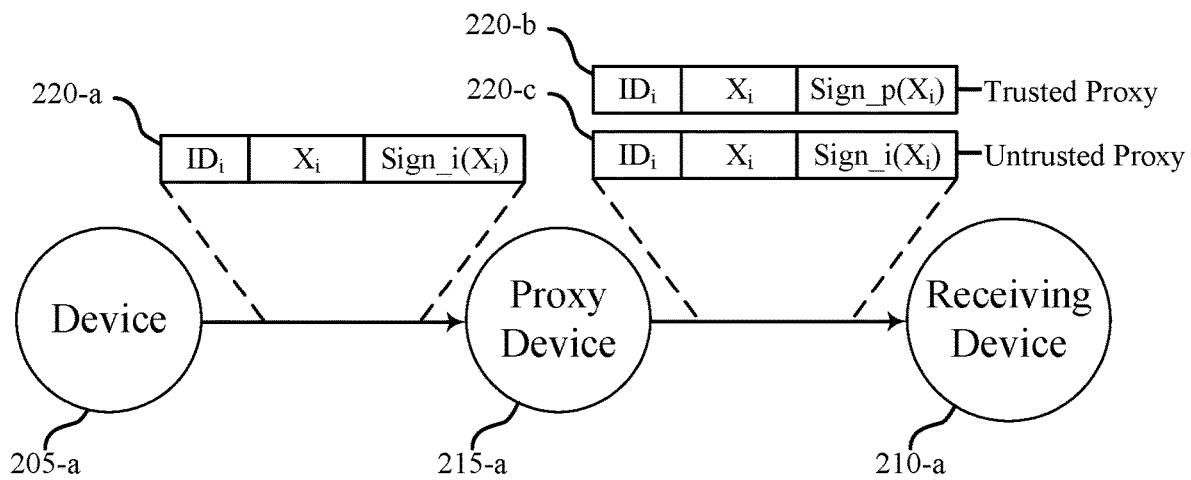
FIGS. 2A and 2B illustrate examples of a data transfer system with a proxy device that supports data provenance in accordance with aspects of the present disclosure.

FIG. 2A illustrates an example of a data transfer system 200-a with a proxy device that supports data provenance in accordance with aspects of the present disclosure. In some examples, the data transfer system 200-a may implement aspects of data transfer system 100. The data transfer system 200-a may include a device 205-a, which may be an example of the device 105 described with reference to FIG. 1; a proxy device 215-a; and a receiving device 210-a, which may be an example of the receiving device 110 described with reference to FIG. 1. The data transfer system 200 may illustrate aspects of the generation and transfer of a data transmission 220 from the device 205-a to the receiving device 210-a via a proxy device 215-a, while maintaining the privacy or provenance of the data.

The proxy device 215-a may be an intermediary device between the device 205-a and the receiving device 210-a. For example, the proxy device 215-a may be an electronic device such as a server, a cloud-based storage, mobile device, a management device, or the like. In some cases, the proxy may be a management device that receives the data transmission 220 from the device 205-a and coordinates storing the data transmission 220 in a storage (e.g., cloud-based storage) or transfer of the data transmission 220-a to one or more receiving devices 210-a. In some aspects, the proxy device 215-a may interface with one or more systems to determine if the device 205-a is authorized to store the data or verify that the data transmission 220 is from an authorized device. In some cases, the proxy device 215-a may interface with one or more systems to determine if the receiving device in authorized to access or receive the data transmission 220.

The device 205-a may generate or collect data to be sent to the receiving device 210-a via a proxy device 215-a. In some cases, the proxy device 215-a may be trusted by the receiving device 210-a. As such, the device 205-a may send a data transmission 220-a to the proxy device 215-a that includes the encrypted data (e.g., $X_i$) and a data ID (e.g., $ID_i$). The proxy device 215-a may sign the device using a signature key to generate a data signature (e.g., $Sign\_p(X_i)$). In this regard, the trusted proxy device 215-a, via the proxy signature, may provide provenance information for the data. Upon signing the data, the proxy device 215-a may send the signed data transmission 220-b to the receiving device 210-a. In some cases, the receiving device 210-a may use the proxy signature to verify that the data transmission 220-b was generated or produced by the device 205-a.

In some cases, the device may generate or collect data to be sent to the receiving device 210-a via an untrusted proxy. For example, the proxy device 215-a may not be trusted by the receiving device 210-a. As such, the device 205-a may send a data transmission 220-a to the proxy device 215-a that includes the encrypted data (e.g., $X_i$), a data ID (e.g., $ID_i$) and is signed by the device 205-a using a device 205-a signature to generate the data signature (e.g., $Sign\_i(X_j)$). The proxy device 215-a may send the data transmission 220-c to the receiving device 210-a and the receiving device may verify that the data transmission was produced or sent by the device 205-a by verifying the device 205-a signature.

In some cases, the receiving device 210-a may have access to the encryption key for decrypting the data in the data transmission 220. As such, the receiving device 210-a may use the data signature, data ID, encryption key or a combination thereof to evaluate the provenance of the data.

Figure 2B:
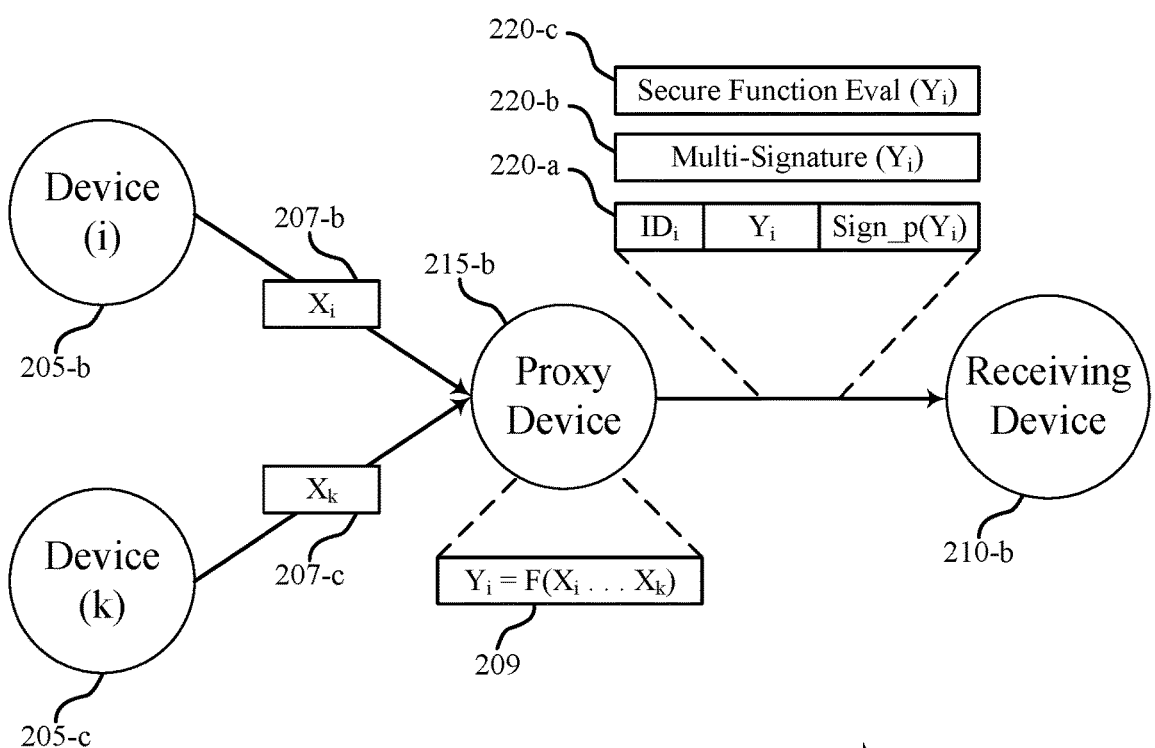

FIG. 2B illustrates an example of a data transfer system 200-b with a proxy aggregating device that supports data provenance in accordance with aspects of the present disclosure. In some examples, the data transfer system 200-b may implement aspects of data transfer systems 100 or 200-a. The data transfer system 200-b may include devices 205-b and 205-c, which may be an example of the devices 105 or 205-a described with reference to FIGS. 1 and 2A; a proxy device 215-b, which may be an example of the proxy device 215-a described with reference to FIG. 2A; and a receiving device 210-b, which may be an example of the receiving devices 110 or 210-a described with reference to FIGS. 1 and 2A. The data transfer system 200-b may illustrate aspects of the generation and transfer of a data transmission 220 from the devices 205-b and 205-c to the receiving device 210-a via a proxy aggregating device 215-b. FIG. 2B provides an example of the data transfer system 200-b with two devices 205-b and 205-c. However, in some cases, the data transfer system 200-b may include more than two device that send data to proxy device 215-b.

In some cases, data produced by multiple devices may be combined or evaluated using a function that inputs data from the multiple different devices and outputs a data result. The data result from the multiple data inputs may be used, transferred, or stored by the receiving device 210-b. In some examples, each device 205-b and 205-c may send a data transmission including encrypted data, a data ID and signed by that device to the receiving device 210-b as described herein. The receiving device 210-b may then verify the signature, decrypt the data, organize the data (e.g., using the data ID) received from each device. The receiving device 210-b may process or combine the data from the multiple devices (e.g., 205-b, 205-c). However, the receiving device 210-b would have access to the data produced by each device and may be able to associate each data with a specific device. In some cases, for example, to protect the privacy of the devices, it may be desirable for the receiving device 210-b to receive, verify and process data from each device with being able to correlate specific data to specific devices. In some cases, the proxy device 215-b may process data from multiple devices (e.g., 205-b and 205-c) or interface with the devices to provide provenance of the data or send a data result to the receiving device 210-b.

In some cases, the device 205 may send data packages 207 to the proxy device 215-b. The proxy device 215-5 may generate a processed data package 209 from the received data packages 207. In some cases, the data packages 207 may be encrypted and the processed data package 209 may include each of the encrypted data packages 207, for example, to be sent to and decrypted by the receiving device 210-b. In some examples, the proxy device 215-b may decrypt the data packages 207 or receive un-encrypted data packages 207 from the devices 205. The proxy device 215-b may organize, consolidate, compress or otherwise process the data in the data packages 207 to generate the processed data package 209. For, example the processed data package 209 may include the raw data from each of the devices 205 in a single data package. In other examples, the proxy device 215-b may perform one or more functions or processes using the data from the data packages 207 to generate the processed data package 209. For example, the proxy device 215-b could compute an average of data values from the data packages 207 to generate an average date value across all the devices 205. In these cases, the processed data package 209 could include the average value. In some cases, the proxy device may encrypt the processed data package 209, for example, in cases where the data has not been encrypted by the devices 207 or the proxy device 215-b has decrypted the data received from the devices 205.

The proxy device 215-b may interface with the devices 205 to generate and send a data transmission 220 that establishes provenance of the data to the receiving device 210-b. In a first example, a signature processes may be used, in a second example, a multi-signature evaluation may be used, and in a third example a secure function evaluation may be used.

In the first example, the proxy device 215-b may encrypt the processed data package 209 (e.g., $Y_i$) and generate a data ID (e.g., $ID_i$) associated with the processed data package 209. In some cases, the proxy device 215-b generate a processed data transmission 220-a by signing the processed data package 209 and the data ID with a signature key to generate a data signature (e.g., Sign_p($Y_i$)). Then, the proxy device 212-b may send the processed data transmission 220-a to the receiving device 210-b. The receiving device may verify the proxy device 215-b signature for example by using a public key associated with the proxy device 215-b. In some cases, the receiving device 210-b may also have access to the encryption key and be able to access the processed data by decrypting the processed data package 209.

In a second example, the proxy device 215-b and devices 205 may perform a multi-signature process on the processed data package 209. In some cases, the multi-signature process includes generating a signature for the processed data package 209 by having all the devices that contributed data to the processed data package 209 participate in generating a signature for the processed data package 209. For example, the multi-signature process may be used if the proxy device 215-b is an untrusted device. In this regard, the signature generated from the collective participation of the devices 205 may verify or develop the provenance or the data in the processed data transmission 220-b. In some cases, the multi-signature processes results in a single signature from the collective participation of the device that generated data (e.g., devices 205), and thus, the provenance of the data in the processed data transmission may be verified using a single key (e.g., single public key).

In some cases, the multi-signature process may be performed using a Gap Diffie-Hellman procedure. For example, each device that produced data may also collectively compute the processed data package 209 and collectively sign the processed data package 209 to generate the processed data transmission 220-b using a Gap Diffie-Hellman procedure.

In some examples, the multi-signature process may include a threshold signature process. For example, the receiving device 210-b may receive an indication that the processed data package 209 was generated with data from a defined number of devices (e.g., 100 devices). The data signature generated from the multi-signature process may indicate to the receiving device 210-b how many devices participated in generating the processed data package 209. For example, the receiving device 210-b may receive a processed data transmission 220-b in which the signature indicates that less than all the defined number of devices (e.g., 75 out of 100 devices) generated the processed data package 209. In this example, the receiving device 210-b may compare the number of devices that generated the processed data package 209 to a threshold. If the threshold is satisfied, then the receiving device 210-b may be configured to accept or trust the processed data package 209. However, if the threshold is not satisfied, then the receiving device may discard or determine that the processed data package 209 cannot be packaged.

In a third example, a secure function evaluation may be performed on the processed data package 209 to generate the data transmission 220-c. In some case, the proxy device 215-b or the devices 205 may perform a secure function evaluation to sign the processed data package 209 and generate the processed data transmission 220-c. In this regard, the device 215-b may collectively generate and sign the processed data package 209 without revealing their own data to the other devices. As such, the receiving device 210-b may receive processed data (e.g., $Y_i$) and evaluate the provenance of the data based on the signature generated from the secure function evaluation process, but also may not know which devices contributed which data.

Figure 3:
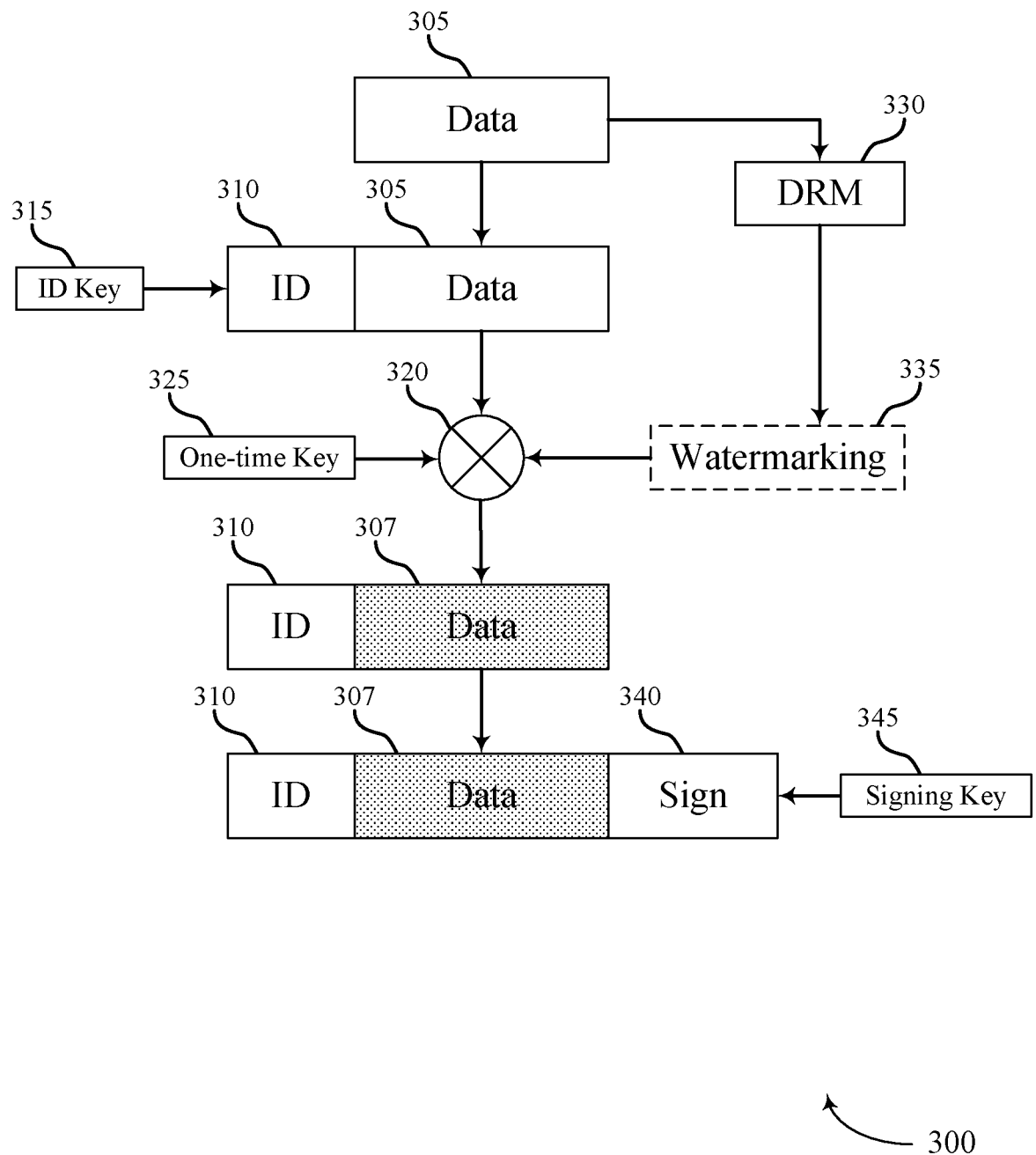
FIG. 3 illustrates an example of a data identification and signature process that supports data provenance in accordance with aspects of the present disclosure.

FIG. 3 illustrates an example of a data identification and signature process 300 that supports data provenance in accordance with aspects of the present disclosure. In some examples, the data identification and signature process 300 may implement aspects of data transfer systems 100, 200-a, 200-b or 300.

A device, which may be an example of the devices 105 and 205 described with references to FIGS. 1-2, may produce data 305. In some cases, the data 305 may contain metadata and application data, which may be stored together or separately. The metadata may include time, place, device information, device state, or any combination thereof. The device may also generate a data ID 310 that is associated with the data. The data ID 310 may be based on an ID key 315, a data index, a data type, which may indicate whether the data is application data or metadata and a data label. The ID key 315 may be a secret key that is only shared with the device and an authorized receiver of the data, the data index may associate the data with other, related, data packages, the data label which may associate the data with a device or owner or the data. For example, the data ID 310 may be a hash of the ID key 315, the data index, the data type, the metadata, or a combination thereof. In some examples, the ID key 315 may be based on a keyed hash function. In this regard, the ID key 315 may be only accessible to the device or an authorized receiver of the device. As such, only a device that has access to the ID key 315 may be able to decode the data ID 310 and access the associated information (e.g., metadata, index, data type, data label or the like). Further, only a device that can decode an access the data ID 310, may be able to associate, based on the index, the data 305 with related data packages.

In some examples, a digital rights management procedure 330 may be performed on the data 305. For example, a digital watermarking process 335 may be performed on the data at 335, such that the authenticity of the data 305 may be evaluated after the data 305 has been received by a receiving device.

The data 305 may be encrypted at 320 to produce an encrypted data package 307. In some cases, the data 305 may be encrypted using a one-time key 325. The one-time key 325 may be generated based on a secret key, the data ID 310, the data type or other unique parameters of the data or metadata. For example, the one-time key 325 may be generated from a hash process on a secret key, the data ID 310 and information associated with the data type. They secret key may only be shared with trusted devices, for example, a device that produced the data and uses the secret key to create the one-time key 325, and a device the receives the data, and uses the secured key to accesses the data 305. In other examples, the one-time key 325 may be generated using a public key process. For example, the one-time key 325 be generated using an integrated encryption scheme (IES) such as an elliptical curve IES.

The encrypted data package 307 and data ID 310 may be signed to generate a data signature 340 using a signing key 345, which may be an example of the signing processes described herein. The signing key 345 may be either a provisioned permanent key for the device or derived based at least in part on the provisioned permanent key for the device. For example, the data signature 340 may be generated via a private key stored or accessible by the device producing the data. The private key may be based on the device ID, be a temporary key, or a combination thereof. In some cases, a public key associated with the private key may be accessible by a device receiving the data. As such, the receiving device may be able to verify or confirm that the encrypted data 307 and data ID 310 were generated by a specific device. In some examples, the signing key 345 may be based on a hash process of the device ID, the encrypted data, or a combination thereof. Further, in some examples, the signing key and corresponding public key may be associated with the encrypted data package 307. For example, a device may send the encrypted data package to a data management system, which may manage storage and access of the encrypted data package 307. In some cases, sending the data package 307 to the data management system may include associating the data package 307 with a transaction identification (ID). In this regard, the signing key 345 may also be associated with the transaction ID.

Figure 4:
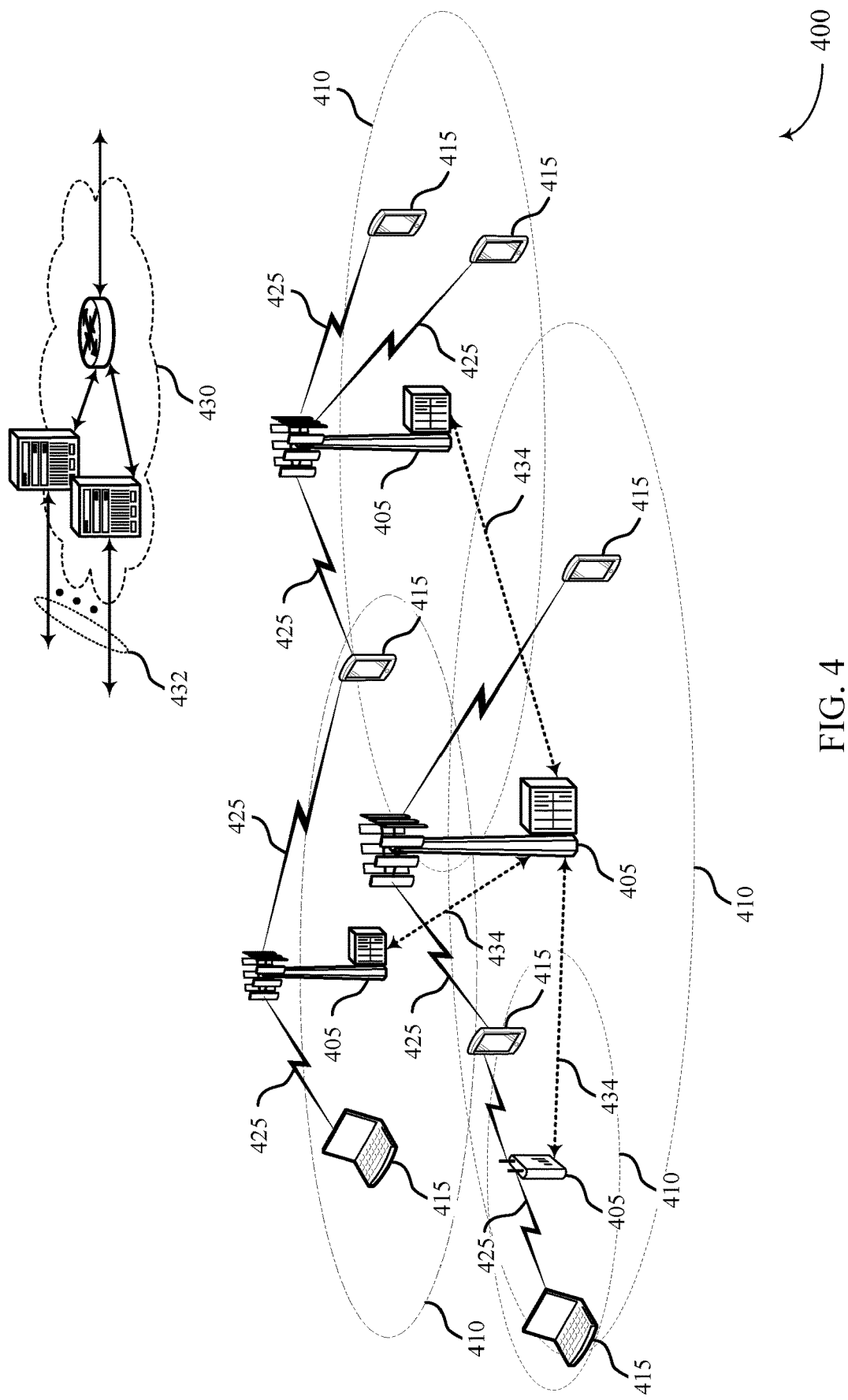
FIG. 4 illustrates an example of a system for wireless communication that supports data provenance in accordance with aspects of the present disclosure.

FIG. 4 illustrates an example of a wireless communications system 400 that supports data provenance in accordance with aspects of the present disclosure. The wireless communications system 400 includes base stations 405, UEs 415, and a core network 430, which may be examples of the devices 105 or 205; the receiving devices 110 or 210; or proxy devices 215 described with reference to FIGS. 1-2. In some examples, the wireless communications system 400 may be a Long Term Evolution (LTE) network, an LTE-Advanced (LTE-A) network, an LTE-A Pro network, or a New Radio (NR) network. In some cases, wireless communications system 400 may support enhanced broadband communications, ultra-reliable (e.g., mission critical) communications, low latency communications, or communications with low-cost and low-complexity devices.

Base stations 405 may wirelessly communicate with UEs 415 via one or more base station antennas. Base stations 405 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 400 may include base stations 405 of different types (e.g., macro or small cell base stations). The UEs 415 described herein may be able to communicate with various types of base stations 405 and network equipment including macro eNBs, small cell eNBs, gNBs, relay base stations, and the like.

Each base station 405 may be associated with a particular geographic coverage area 410 in which communications with various UEs 415 is supported. Each base station 405 may provide communication coverage for a respective geographic coverage area 410 via communication links 425, and communication links 425 between a base station 405 and a UE 415 may utilize one or more carriers. Communication links 425 shown in wireless communications system 400 may include uplink transmissions from a UE 415 to a base station 405, or downlink transmissions from a base station 405 to a UE 415. Downlink transmissions may also be called forward link transmissions while uplink transmissions may also be called reverse link transmissions.

The geographic coverage area 410 for a base station 405 may be divided into sectors making up a portion of the geographic coverage area 410, and each sector may be associated with a cell. For example, each base station 405 may provide communication coverage for a macro cell, a small cell, a hot spot, or other types of cells, or various combinations thereof. In some examples, a base station 405 may be movable and therefore provide communication coverage for a moving geographic coverage area 410. In some examples, different geographic coverage areas 410 associated with different technologies may overlap, and overlapping geographic coverage areas 410 associated with different technologies may be supported by the same base station 405 or by different base stations 405. The wireless communications system 400 may include, for example, a heterogeneous LTE/LTE-A/LTE-A Pro or NR network in which different types of base stations 405 provide coverage for various geographic coverage areas 410.

The term "cell" refers to a logical communication entity used for communication with a base station 405 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 410 (e.g., a sector) over which the logical entity operates.

UEs 415 may be dispersed throughout the wireless communications system 400, and each UE 415 may be stationary or mobile. A UE 415 may also be referred to as a mobile device, a wireless device, a remote device, a handheld device, or a subscriber device, or some other suitable terminology, where the "device" may also be referred to as a unit, a station, a terminal, or a client. A UE 415 may also be a personal electronic device such as a cellular phone, a personal digital assistant (PDA), a tablet computer, a laptop computer, or a personal computer. In some examples, a UE 415 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 415, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 405 without human intervention. In some examples, M2M communication or MTC may include communications from devices that integrate sensors or meters to measure or capture information and relay that information to a central server or application program that can make use of the information or present the information to humans interacting with the program or application. Some UEs 415 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 415 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 415 include entering a power saving "deep sleep" mode when not engaging in active communications, or operating over a limited bandwidth (e.g., according to narrowband communications). In some cases, UEs 415 may be designed to support critical functions (e.g., mission critical functions), and a wireless communications system 400 may be configured to provide ultra-reliable communications for these functions.

In some cases, a UE 415 may also be able to communicate directly with other UEs 415 (e.g., using a peer-to-peer (P2P) or device-to-device (D2D) protocol). One or more of a group of UEs 415 utilizing D2D communications may be within the geographic coverage area 410 of a base station 405. Other UEs 415 in such a group may be outside the geographic coverage area 410 of a base station 405, or be otherwise unable to receive transmissions from a base station 405. In some cases, groups of UEs 415 communicating via D2D communications may utilize a one-to-many (1:M) system in which each UE 415 transmits to every other UE 415 in the group. In some cases, a base station 405 facilitates the scheduling of resources for D2D communications. In other cases, D2D communications are carried out between UEs 415 without the involvement of a base station 405.

Base stations 405 may communicate with the core network 430 and with one another. For example, base stations 405 may interface with the core network 430 through backhaul links 432 (e.g., via an S1, N2, N3, or other interface). Base stations 405 may communicate with one another over backhaul links 434 (e.g., via an X2, Xn, or other interface) either directly (e.g., directly between base stations 405) or indirectly (e.g., via core network 430).

The core network 430 may provide user authentication, access authorization, tracking, Internet Protocol (IP) connectivity, and other access, routing, or mobility functions. The core network 430 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 415 served by base stations 405 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 405, may include subcomponents such as an access network entity, which may be an example of an access node controller (ANC). Each access network entity may communicate with UEs 415 through a number of other access network transmission entities, which may be referred to as a radio head, a smart radio head, or a transmission/reception point (TRP). In some configurations, various functions of each access network entity or base station 405 may be distributed across various network devices (e.g., radio heads and access network controllers) or consolidated into a single network device (e.g., a base station 405).

Wireless communications system 400 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 415 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 400 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 400 may also operate in an extremely high frequency (EHF) region of the spectrum (e.g., from 30 GHz to 300 GHz), also known as the millimeter band. In some examples, wireless communications system 400 may support millimeter wave (mmW) communications between UEs 415 and base stations 405, and EHF antennas of the respective devices may be even smaller and more closely spaced than UHF antennas. In some cases, this may facilitate use of antenna arrays within a UE 415. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 400 may utilize both licensed and unlicensed radio frequency spectrum bands. For example, wireless communications system 400 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 405 and UEs 415 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 405 or UE 415 may be equipped with multiple antennas, which may be used to employ techniques such as transmit diversity, receive diversity, multiple-input multiple-output (MIMO) communications, or beamforming. For example, wireless communications system 400 may use a transmission scheme between a transmitting device (e.g., a base station 405) and a receiving device (e.g., a UE 415), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 405 or a UE 415) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 405 may use multiple antennas or antenna arrays to conduct beamforming operations for directional communications with a UE 415. For instance, some signals (e.g., synchronization signals, reference signals, beam selection signals, or other control signals) may be transmitted by a base station 405 multiple times in different directions, which may include a signal being transmitted according to different beamforming weight sets associated with different directions of transmission. Transmissions in different beam directions may be used to identify (e.g., by the base station 405 or a receiving device, such as a UE 415) a beam direction for subsequent transmission and/or reception by the base station 405.

Some signals, such as data signals associated with a particular receiving device, may be transmitted by a base station 405 in a single beam direction (e.g., a direction associated with the receiving device, such as a UE 415). In some examples, the beam direction associated with transmissions along a single beam direction may be determined based at least in in part on a signal that was transmitted in different beam directions. For example, a UE 415 may receive one or more of the signals transmitted by the base station 405 in different directions, and the UE 415 may report to the base station 405 an indication of the signal it received with a highest signal quality, or an otherwise acceptable signal quality. Although these techniques are described with reference to signals transmitted in one or more directions by a base station 405, a UE 415 may employ similar techniques for transmitting signals multiple times in different directions (e.g., for identifying a beam direction for subsequent transmission or reception by the UE 415), or transmitting a signal in a single direction (e.g., for transmitting data to a receiving device).

A receiving device (e.g., a UE 415, which may be an example of a mmW receiving device) may try multiple receive beams when receiving various signals from the base station 405, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 405 or UE 415 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 405 may be located in diverse geographic locations. A base station 405 may have an antenna array with a number of rows and columns of antenna ports that the base station 405 may use to support beamforming of communications with a UE 415. Likewise, a UE 415 may have one or more antenna arrays that may support various MIMO or beamforming operations.

In some cases, wireless communications system 400 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 415 and a base station 405 or core network 430 supporting radio bearers for user plane data. At the Physical layer, transport channels may be mapped to physical channels.

In some cases, UEs 415 and base stations 405 may support retransmissions of data to increase the likelihood that data is received successfully. HARQ feedback is one technique of increasing the likelihood that data is received correctly over a communication link 425. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 400, and may be referred to as a transmission time interval (TTI). In other cases, a smallest scheduling unit of the wireless communications system 400 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 415 and a base station 405.

The term "carrier" refers to a set of radio frequency spectrum resources having a defined physical layer structure for supporting communications over a communication link 425. For example, a carrier of a communication link 425 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 415. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 400. For example, the carrier bandwidth may be one of a number of predetermined bandwidths for carriers of a particular radio access technology (e.g., 1.4, 3, 5, 10, 15, 20, 40, or 80 MHz). In some examples, each served UE 415 may be configured for operating over portions or all of the carrier bandwidth. In other examples, some UEs 415 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 415 receives and the higher the order of the modulation scheme, the higher the data rate may be for the UE 415. In MIMO systems, a wireless communications resource may refer to a combination of a radio frequency spectrum resource, a time resource, and a spatial resource (e.g., spatial layers), and the use of multiple spatial layers may further increase the data rate for communications with a UE 415.

Devices of the wireless communications system 400 (e.g., base stations 405 or UEs 415) may have a hardware configuration that supports communications over a particular carrier bandwidth, or may be configurable to support communications over one of a set of carrier bandwidths. In some examples, the wireless communications system 400 may include base stations 405 and/or UEs 415 that support simultaneous communications via carriers associated with more than one different carrier bandwidth.

Wireless communications system 400 may support communication with a UE 415 on multiple cells or carriers, a feature which may be referred to as carrier aggregation or multi-carrier operation. A UE 415 may be configured with multiple downlink component carriers and one or more uplink component carriers according to a carrier aggregation configuration. Carrier aggregation may be used with both FDD and TDD component carriers.

In some cases, wireless communications system 400 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 415 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 415 or base station 405, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 400 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more devices (e.g., devices, proxy devices or receiving devices) may be an example of a UE or other device that transfers data over the wireless communications system 400. For example, the devices 105 and 205, receiving devices 110 and 210 or proxy devices 215 may be examples of the UE 415 or base station 405 and implement one or more aspects of the wireless network 400. In some cases, the data transmission 115 or 215 may be communicated via one or more components of the wireless network 400.

Figure 5:
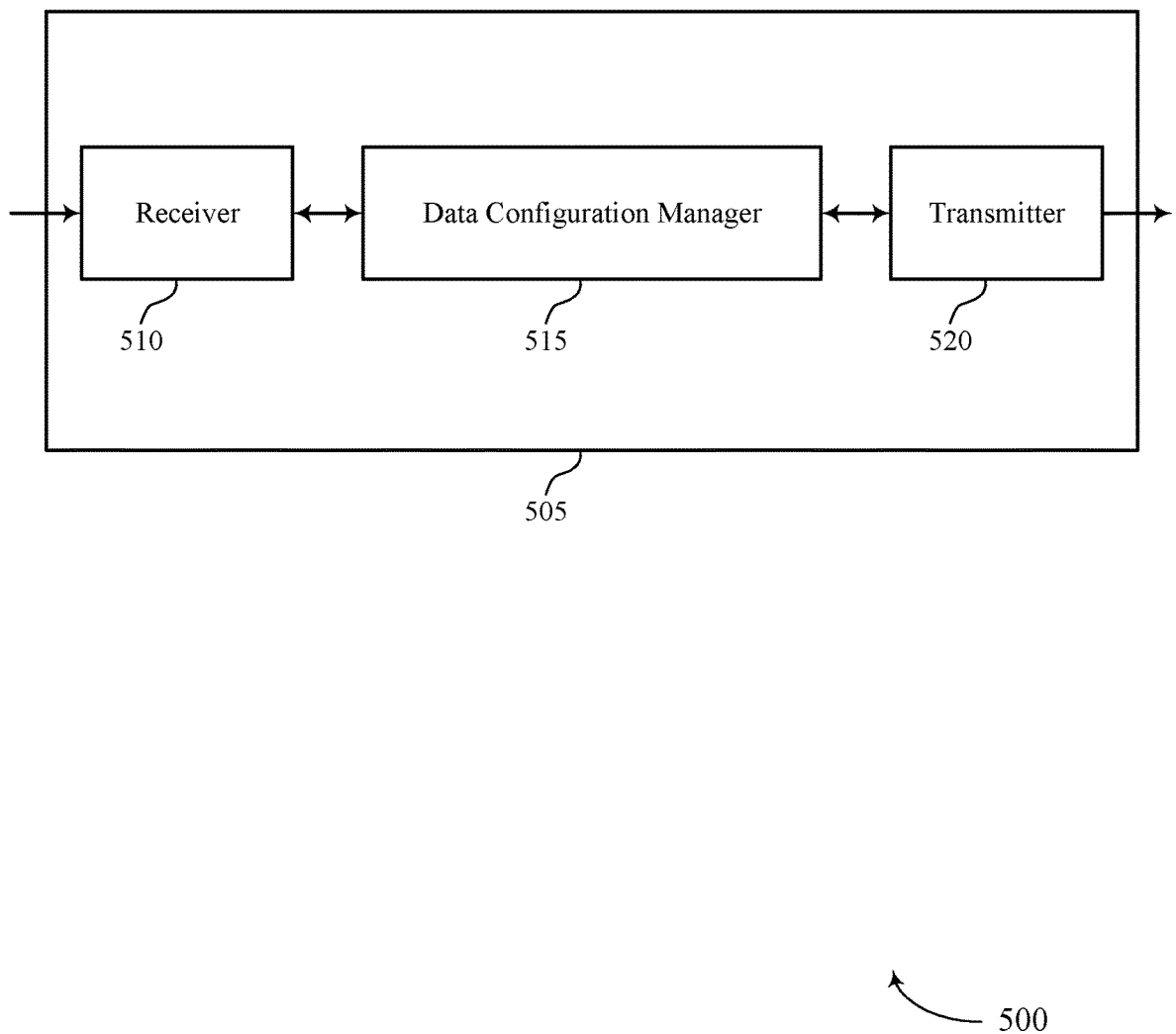
FIGS. 5 and 6 show block diagrams of devices that support data provenance in accordance with aspects of the present disclosure.

FIG. 5 shows a block diagram 500 of a device 505 that supports data provenance in accordance with aspects of the present disclosure. The device 505 may be an example of aspects of a UE 415 as described herein. The device 505 may include a receiver 510, a data configuration manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to data provenance, etc.). Information may be passed on to other components of the device 505. The receiver 510 may be an example of aspects of the transceiver 820 described with reference to FIG. 8. The receiver 510 may utilize a single antenna or a set of antennas.

The data configuration manager 515 may determine that the device is to provide provenance information for data generated at the device and to be stored in a storage, where the determining is based on a configuration profile, generate a data identifier for the data based on an identifier generation key, generate an encryption key based on a key associated with an owner of the device, encrypt the data using the encryption key, generate a signing key based on the encrypted data and the data identifier, and sign the data that includes the encrypted data and the data identifier using the signing key. The data configuration manager 515 may be an example of aspects of the data configuration manager 810 described herein.

The data configuration manager 515, or its sub-components, may be implemented in hardware, code (e.g., software or firmware) executed by a processor, or any combination thereof. If implemented in code executed by a processor, the functions of the data configuration manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The data configuration manager 515, or its sub-components, may be physically located at various positions, including being distributed such that portions of functions are implemented at different physical locations by one or more physical components. In some examples, the data configuration manager 515, or its sub-components, may be a separate and distinct component in accordance with various aspects of the present disclosure. In some examples, the data configuration manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the data configuration manager 515 as described herein may be implemented to realize one or more potential advantages. One implementation may allow a device 505 to provide improved quality and reliability of service at the device 505 by ensuring the authenticity of data.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
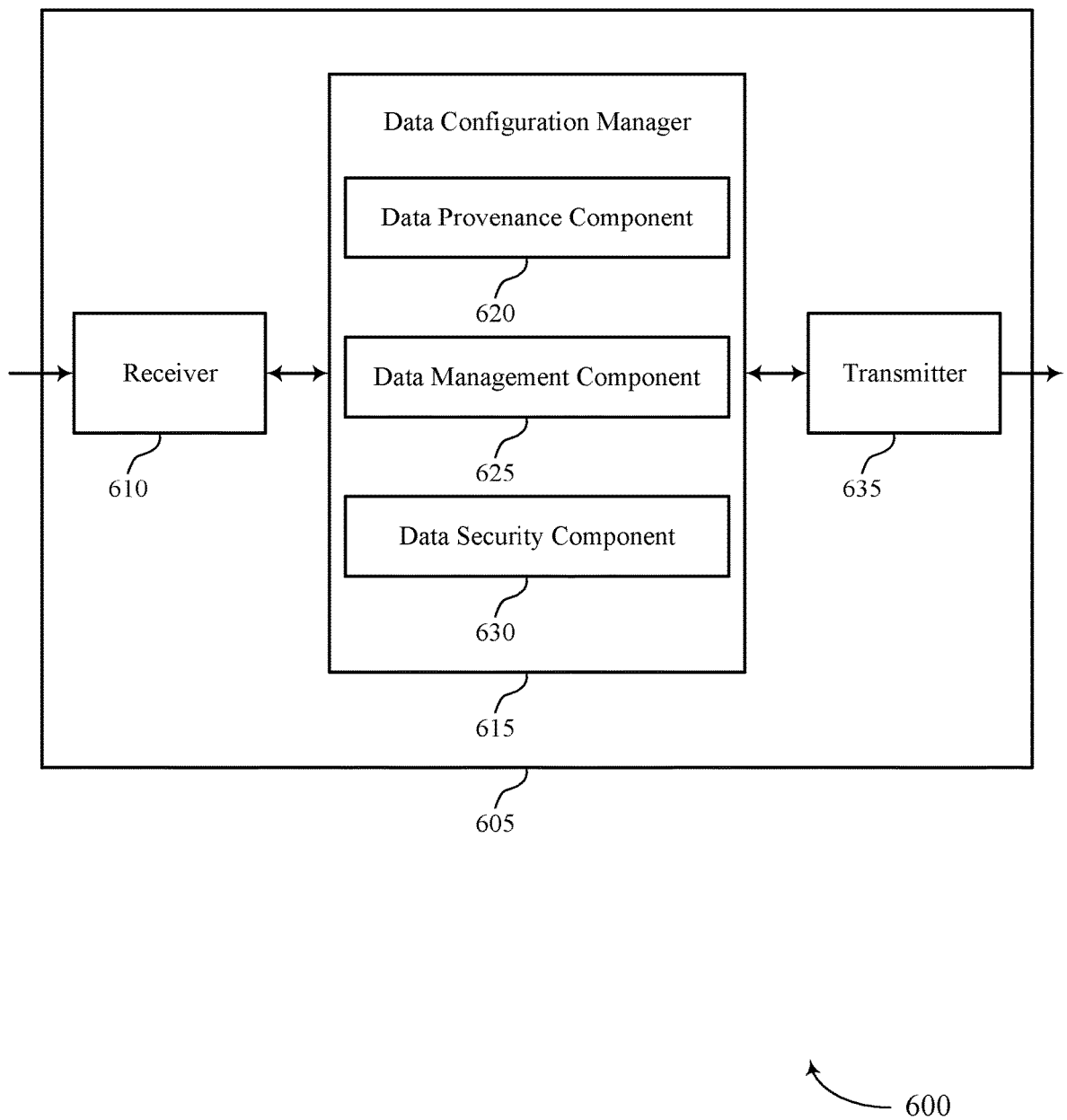

FIG. 6 shows a block diagram 600 of a device 605 that supports data provenance in accordance with aspects of the present disclosure. The device 605 may be an example of aspects of a device 505, or a UE 415 as described herein. The device 605 may include a receiver 610, a data configuration manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to data provenance, etc.). Information may be passed on to other components of the device 605. The receiver 610 may be an example of aspects of the transceiver 820 described with reference to FIG. 8. The receiver 610 may utilize a single antenna or a set of antennas.

The data configuration manager 615 may be an example of aspects of the data configuration manager 515 as described herein. The data configuration manager 615 may include a data provenance component 620, a data management component 625, and a data security component 630.

The data configuration manager 615 may be an example of aspects of the data configuration manager 810 described herein.

The data provenance component 620 may determine that the device is to provide provenance information for data generated at the device and to be stored in a storage, where the determining is based on a configuration profile.

The data management component 625 may generate a data identifier for the data based on an identifier generation key. The data management component 625 may generate data at the device based at least in part on metadata associated with the device.

The data security component 630 may generate an encryption key based on a key associated with an owner of the device, encrypt the data using the encryption key, generate a signing key based on the encrypted data and the data identifier, and sign the data that includes the encrypted data and the data identifier using the signing key. The data security component 630 may generate the signing key based at least in part on a provisioned permanent key for the device.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
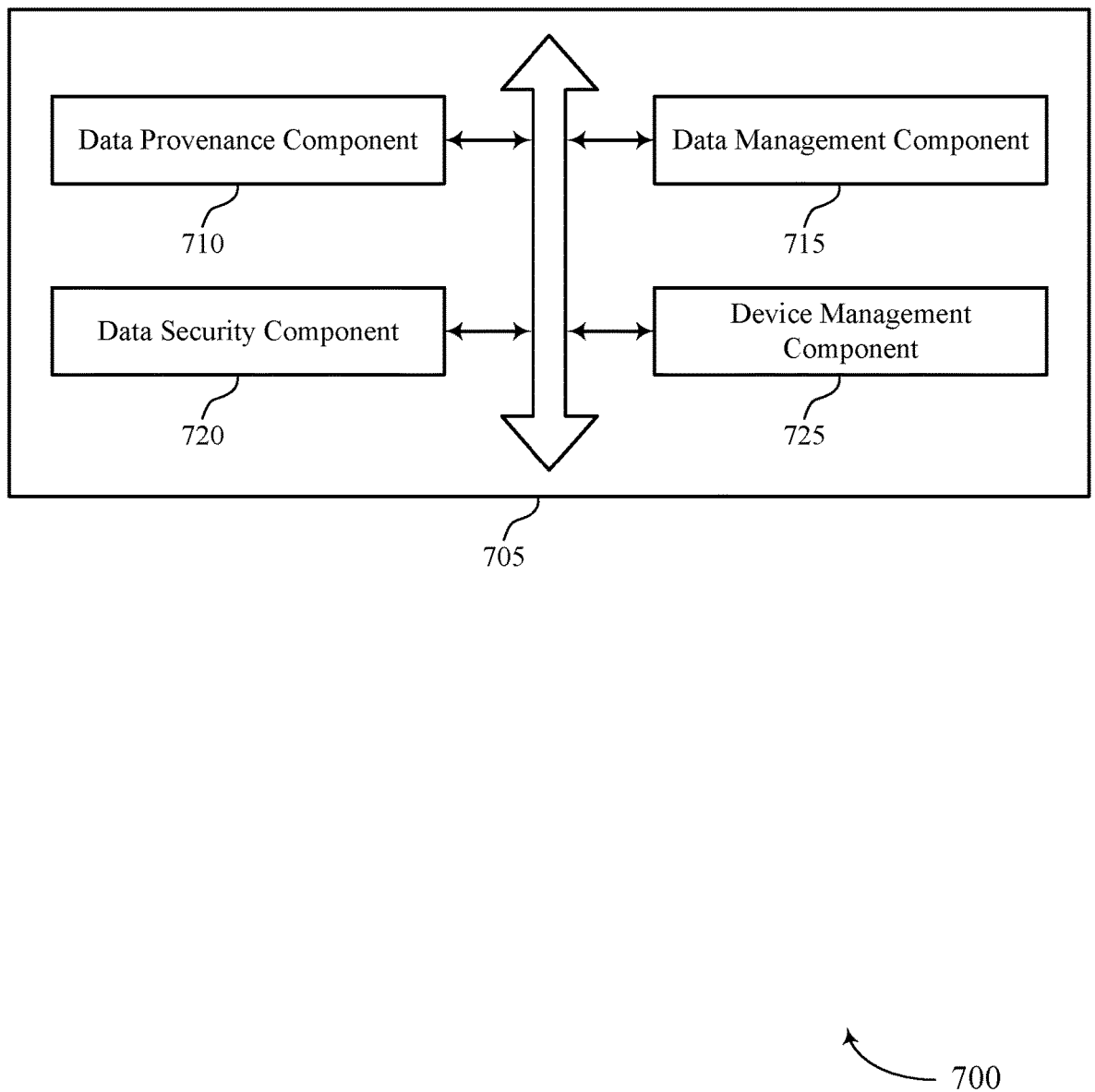
FIG. 7 shows a block diagram of a data configuration manager that supports data provenance in accordance with aspects of the present disclosure.

FIG. 7 shows a block diagram 700 of a data configuration manager 705 that supports data provenance in accordance with aspects of the present disclosure. The data configuration manager 705 may be an example of aspects of a data configuration manager 515, a data configuration manager 615, or a data configuration manager 810 described herein. The data configuration manager 705 may include a data provenance component 710, a data management component 715, a data security component 720, and a device management component 725. Each of these modules may communicate, directly or indirectly, with one another (e.g., via one or more buses).

The data provenance component 710 may determine that the device is to provide provenance information for data generated at the device and to be stored in a storage, where the determining is based on a configuration profile. In some examples, the data provenance component 710 may receive a request to verify that the second data transmission is associated with the data transmission. In some examples, the data provenance component 710 may perform a zero knowledge proof (ZKP) procedure in response to receiving the request, where the ZKP procedure based on the identifier generation key. In some cases, the identifier generation key remains private based on performing the ZKP procedure.

The data management component 715 may generate a data identifier for the data based on an identifier generation key. In some examples, the data management component 715 may identify one or more of: metadata, index data, a data type or a data label associated with the data. In some examples, the data management component 715 may generate the data identifier based on one or more of: the metadata, the index data, the data type or the data label. In some examples, the data management component 715 may compute a hash of one or more of: the identifier generation key, the metadata, the index data, the data type or the data label associated with the data. In some examples, the data management component 715 may generate the data identifier based on the computed hash. In some examples, the data management component 715 may transmit the data transmission and the metadata transmission to the storage. The data management component 715 may generate data at the device based at least in part on metadata associated with the device.

In some examples, identifying, at the device, a second data transmission associated with the data transmission, the second data transmission to be stored at the storage, where the second data transmission includes a second encrypted data and second data identifier, the second data transmission signed using the signing key. In some examples, the data management component 715 may identify a device temporary private key associated with the device. In some examples, the data management component 715 may sign the data transmission using the device temporary private key. In some examples, the data management component 715 may identify, at the device, that the data and the data identifier is to be transmitted to a proxy device. In some examples, the data management component 715 may transmit the encrypted data and the data identifier to the proxy device. In some examples, the data management component 715 may transmit unsigned encrypted data and the data identifier to be signed by the proxy device. In some examples, the data management component 715 may transmit the signed data transmission to the proxy device.

In some cases, the data identifier uniquely identifies the data. In some cases, the data is associated with the metadata based on the identifier generation key. In some cases, the device temporary private key is based on a temporary device identification associated with the device. In some cases, the temporary device identification is based on a public key associated with the device. In some cases, the signing the data transmission includes generating the signing key based at least in part on a hash of the data and the data identifier.

The data security component 720 may generate an encryption key based on a key associated with an owner of the device. In some examples, the data security component 720 may encrypt the data using the encryption key. In some examples, the data security component 720 may generate a signing key based on the encrypted data and the data identifier. In some examples, the data security component 720 may sign the data that includes the encrypted data and the data identifier using the signing key. The data security component 720 may generate the signing key based at least in part on a provisioned permanent key for the device.

In some examples, the data security component 720 may generate the identifier generation key at the device based on a keyed-hash function. In some examples, the data security component 720 may receive a device configuration profile including a security policy, where generating the identifier generation key is based on the security policy, where the security policy including at least a service identifier, service type, service parameters and any combination thereof.

In some examples, the data security component 720 may generate a second one-time encryption key based on the key associated with the owner of the device. In some examples, the data security component 720 may encrypt the metadata using the second one-time encryption key. In some examples, the data security component 720 may sign a metadata transmission that includes the encrypted metadata and the second data identifier using the signing key. In some examples, the data security component 720 may compute a hash of one or more of: a master credential, the identifier generation key, or a data type. In some examples, the data security component 720 may generate the encryption key based on the computed hash. In some examples, the data security component 720 may receive a device configuration profile including a security policy, where the security policy is associated with the owner of the device.

In some examples, the data security component 720 may generate the encryption key based on the security policy. In some examples, the data security component 720 may perform a digital water marking procedure on the data based on encrypting the data using the encryption key. In some examples, the data security component 720 may determine, at the device, that the proxy device is a trusted device. In some examples, the data security component 720 may determine, at the device, that the proxy device is not a trusted device. In some cases, the encryption key is a one-time key associated with the owner of the device. In some cases, at least one of the master credential or the identifier generation key are private credentials associated with the key associated with the owner of the device.

The device management component 725 may receive a device configuration profile including a data generation policy, where the data is generated at the device based as least in part on the data generation policy. In some examples, the device management component 725 may generate a second data identifier for metadata associated with the data based on the identifier generation key. In some cases, the data generation policy includes a triggering condition for the device to obtain one or more data measurements used to generate the data. In some cases, the identifier generation key is a private key stored at the device.

Figure 8:
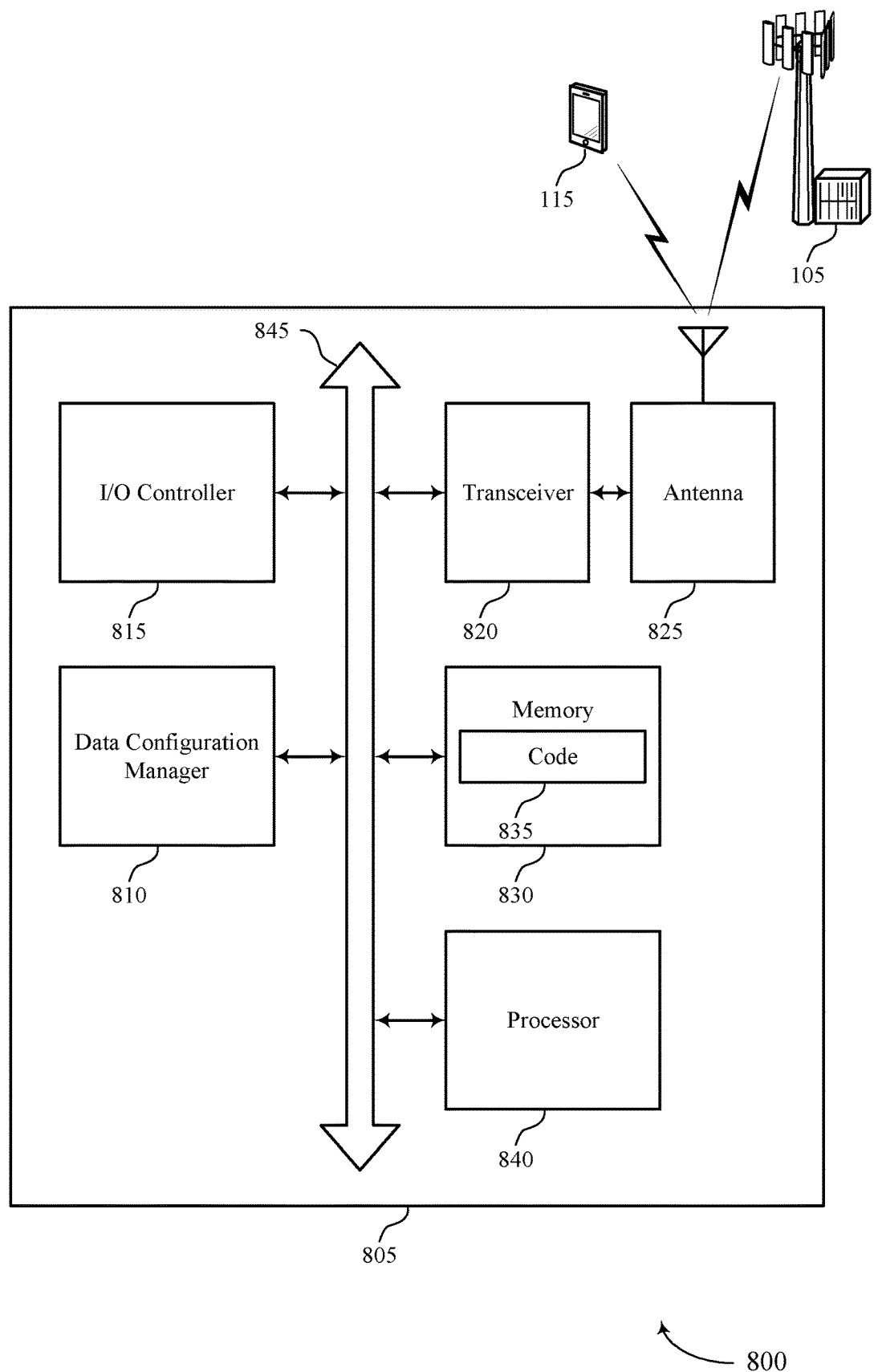
FIG. 8 shows a diagram of a system including a device that supports data provenance in accordance with aspects of the present disclosure.

FIG. 8 shows a diagram of a system 800 including a device 805 that supports data provenance in accordance with aspects of the present disclosure. The device 805 may be an example of or include the components of device 505, device 605, or a UE 415 as described herein. The device 805 may include components for bi-directional voice and data communications including components for transmitting and receiving communications, including a data configuration manager 810, an I/O controller 815, a transceiver 820, an antenna 825, memory 830, and a processor 840. These components may be in electronic communication via one or more buses (e.g., bus 845).

The data configuration manager 810 may determine that the device is to provide provenance information for data generated at the device and to be stored in a storage, where the determining is based on a configuration profile, generate a data identifier for the data based on an identifier generation key, generate an encryption key based on a key associated with an owner of the device, encrypt the data using the encryption key, generate a signing key based on the encrypted data and the data identifier, and sign the data that includes the encrypted data and the data identifier using the signing key.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting data provenance).

Based on processes for supporting data provenance, the processor 840 may efficiently determine the authenticity of data which may in turn improve reliability of service. As such, the processor 840 may be ready to respond more efficiently through the reduction of a ramp up in processing power.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
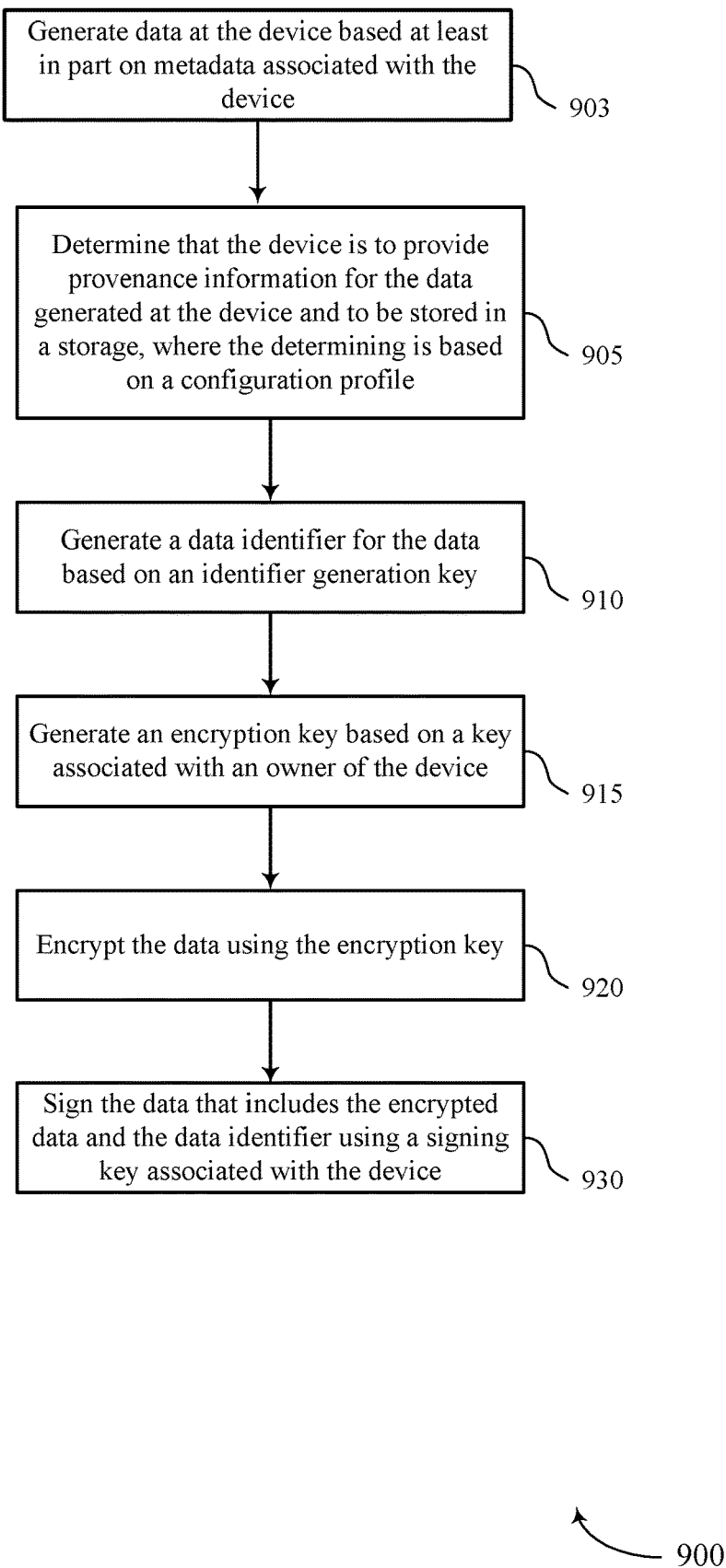
FIGS. 9 through 13 show flowcharts illustrating methods that support data provenance in accordance with aspects of the present disclosure.

FIG. 9 shows a flowchart illustrating a method 900 that supports data provenance in accordance with aspects of the present disclosure. The operations of method 900 may be implemented by a UE 415 or its components as described herein. For example, the operations of method 900 may be performed by a data configuration manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 903, the UE may generate data at the device based at least in part on metadata associated with the device. The operations of 903 may be performed according to the methods described herein. In some examples, aspects of the operations of 903 may be performed by a data management component as described with reference to FIGS. 5 through 8.

At 905, the UE may determine that the device is to provide provenance information for data generated at the device and to be stored in a storage, where the determining is based on a configuration profile. The operations of 905 may be performed according to the methods described herein. In some examples, aspects of the operations of 905 may be performed by a data provenance component as described with reference to FIGS. 5 through 8.

At 910, the UE may generate a data identifier for the data based on an identifier generation key. The operations of 910 may be performed according to the methods described herein. In some examples, aspects of the operations of 910 may be performed by a data management component as described with reference to FIGS. 5 through 8.

At 915, the UE may generate an encryption key based on a key associated with an owner of the device. The operations of 915 may be performed according to the methods described herein. In some examples, aspects of the operations of 915 may be performed by a data security component as described with reference to FIGS. 5 through 8.

At 920, the UE may encrypt the data using the encryption key. The operations of 920 may be performed according to the methods described herein. In some examples, aspects of the operations of 920 may be performed by a data security component as described with reference to FIGS. 5 through 8.

At 930, the UE may sign the data that includes the encrypted data and the data identifier using the signing key associated with the device. The operations of 930 may be performed according to the methods described herein. In some examples, aspects of the operations of 930 may be performed by a data security component as described with reference to FIGS. 5 through 8.

Figure 10:
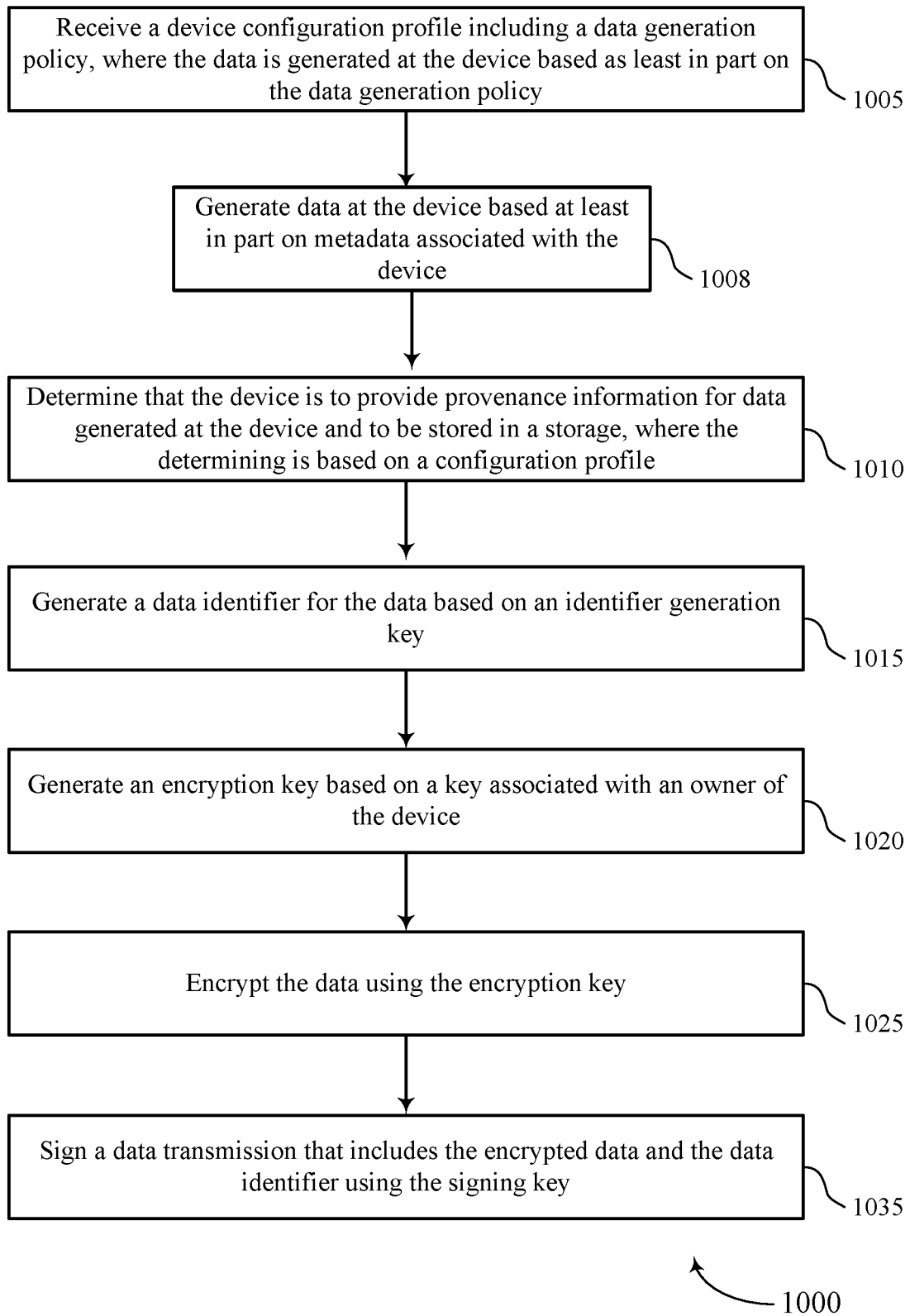

FIG. 10 shows a flowchart illustrating a method 1000 that supports data provenance in accordance with aspects of the present disclosure. The operations of method 1000 may be implemented by a UE 415 or its components as described herein. For example, the operations of method 1000 may be performed by a data configuration manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may receive a device configuration profile including a data generation policy, where the data is generated at the device based as least in part on the data generation policy. The operations of 1005 may be performed according to the methods described herein. In some examples, aspects of the operations of 1005 may be performed by a device management component as described with reference to FIGS. 5 through 8.

At 1008, the UE may generate data at the device based at least in part on metadata associated with the device. The operations of 1008 may be performed according to the methods described herein. In some examples, aspects of the operations of 1008 may be performed by a data management component as described with reference to FIGS. 5 through 8.

At 1010, the UE may determine that the device is to provide provenance information for data generated at the device and to be stored in a storage, where the determining is based on a configuration profile. The operations of 1010 may be performed according to the methods described herein. In some examples, aspects of the operations of 1010 may be performed by a data provenance component as described with reference to FIGS. 5 through 8.

At 1015, the UE may generate a data identifier for the data based on an identifier generation key. The operations of 1015 may be performed according to the methods described herein. In some examples, aspects of the operations of 1015 may be performed by a data management component as described with reference to FIGS. 5 through 8.

At 1020, the UE may generate an encryption key based on a key associated with an owner of the device. The operations of 1020 may be performed according to the methods described herein. In some examples, aspects of the operations of 1020 may be performed by a data security component as described with reference to FIGS. 5 through 8.

At 1025, the UE may encrypt the data using the encryption key. The operations of 1025 may be performed according to the methods described herein. In some examples, aspects of the operations of 1025 may be performed by a data security component as described with reference to FIGS. 5 through 8.

At 1035, the UE may sign the data that includes the encrypted data and the data identifier using a signing key associated with the device. The operations of 1035 may be performed according to the methods described herein. In some examples, aspects of the operations of 1035 may be performed by a data security component as described with reference to FIGS. 5 through 8.

Figure 11:
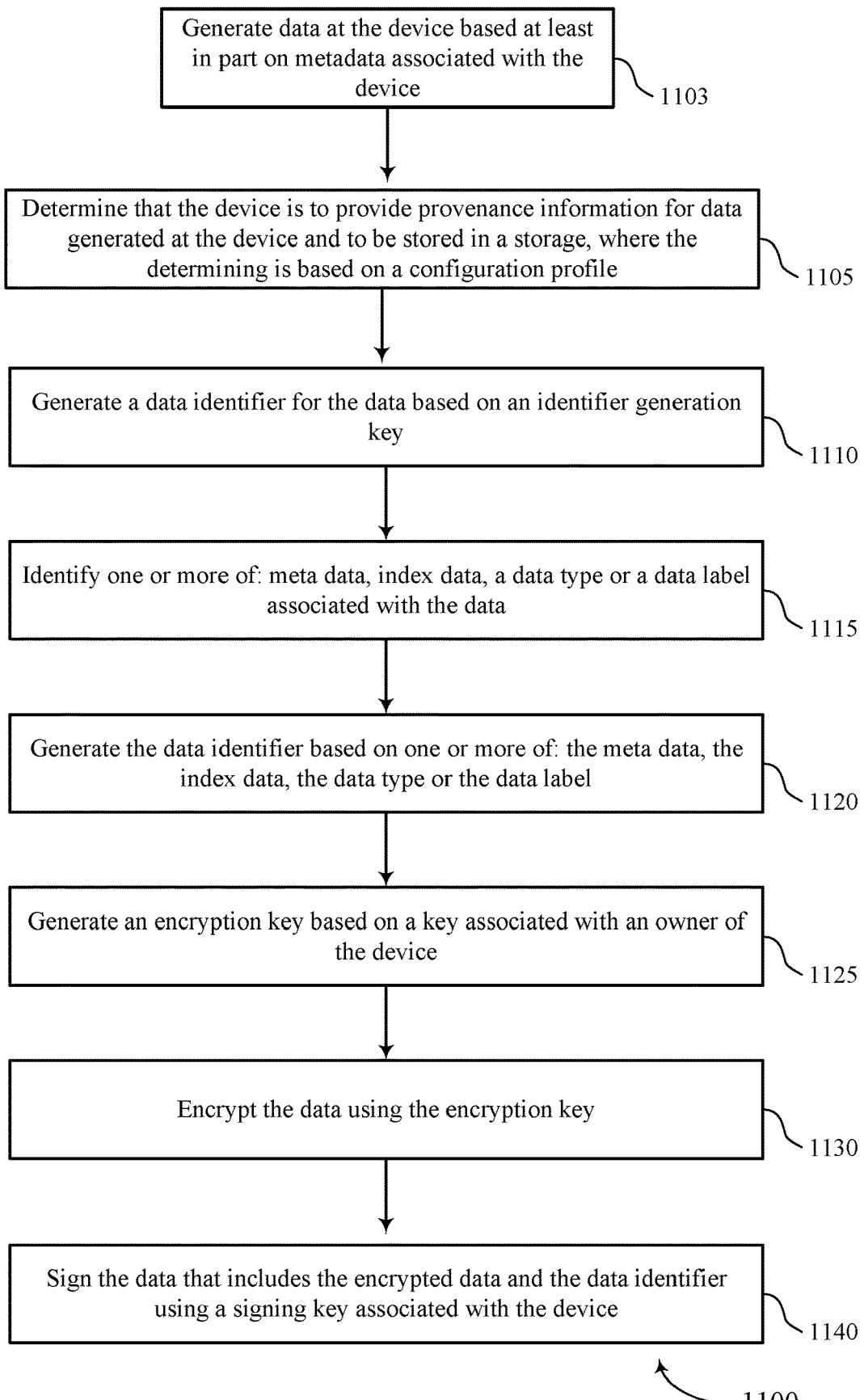

FIG. 11 shows a flowchart illustrating a method 1100 that supports data provenance in accordance with aspects of the present disclosure. The operations of method 1100 may be implemented by a UE 415 or its components as described herein. For example, the operations of method 1100 may be performed by a data configuration manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1103, the UE may generate data at the device based at least in part on metadata associated with the device. The operations of 1103 may be performed according to the methods described herein. In some examples, aspects of the operations of 1103 may be performed by a data management component as described with reference to FIGS. 5 through 8.

At 1105, the UE may determine that the device is to provide provenance information for data generated at the device and to be stored in a storage, where the determining is based on a configuration profile. The operations of 1105 may be performed according to the methods described herein. In some examples, aspects of the operations of 1105 may be performed by a data provenance component as described with reference to FIGS. 5 through 8.

At 1110, the UE may generate a data identifier for the data based on an identifier generation key. The operations of 1110 may be performed according to the methods described herein. In some examples, aspects of the operations of 1110 may be performed by a data management component as described with reference to FIGS. 5 through 8.

At 1115, the UE may identify one or more of: metadata, index data, a data type or a data label associated with the data. The operations of 1115 may be performed according to the methods described herein. In some examples, aspects of the operations of 1115 may be performed by a data management component as described with reference to FIGS. 5 through 8.

At 1120, the UE may generate the data identifier based on one or more of: the metadata, the index data, the data type or the data label. The operations of 1120 may be performed according to the methods described herein. In some examples, aspects of the operations of 1120 may be performed by a data management component as described with reference to FIGS. 5 through 8.

At 1125, the UE may generate an encryption key based on a key associated with an owner of the device. The operations of 1125 may be performed according to the methods described herein. In some examples, aspects of the operations of 1125 may be performed by a data security component as described with reference to FIGS. 5 through 8.

At 1130, the UE may encrypt the data using the encryption key. The operations of 1130 may be performed according to the methods described herein. In some examples, aspects of the operations of 1130 may be performed by a data security component as described with reference to FIGS. 5 through 8.

At 1140, the UE may sign the data that includes the encrypted data and the data identifier using a signing key associated with the device. The operations of 1140 may be performed according to the methods described herein. In some examples, aspects of the operations of 1140 may be performed by a data security component as described with reference to FIGS. 5 through 8.

Figure 12:
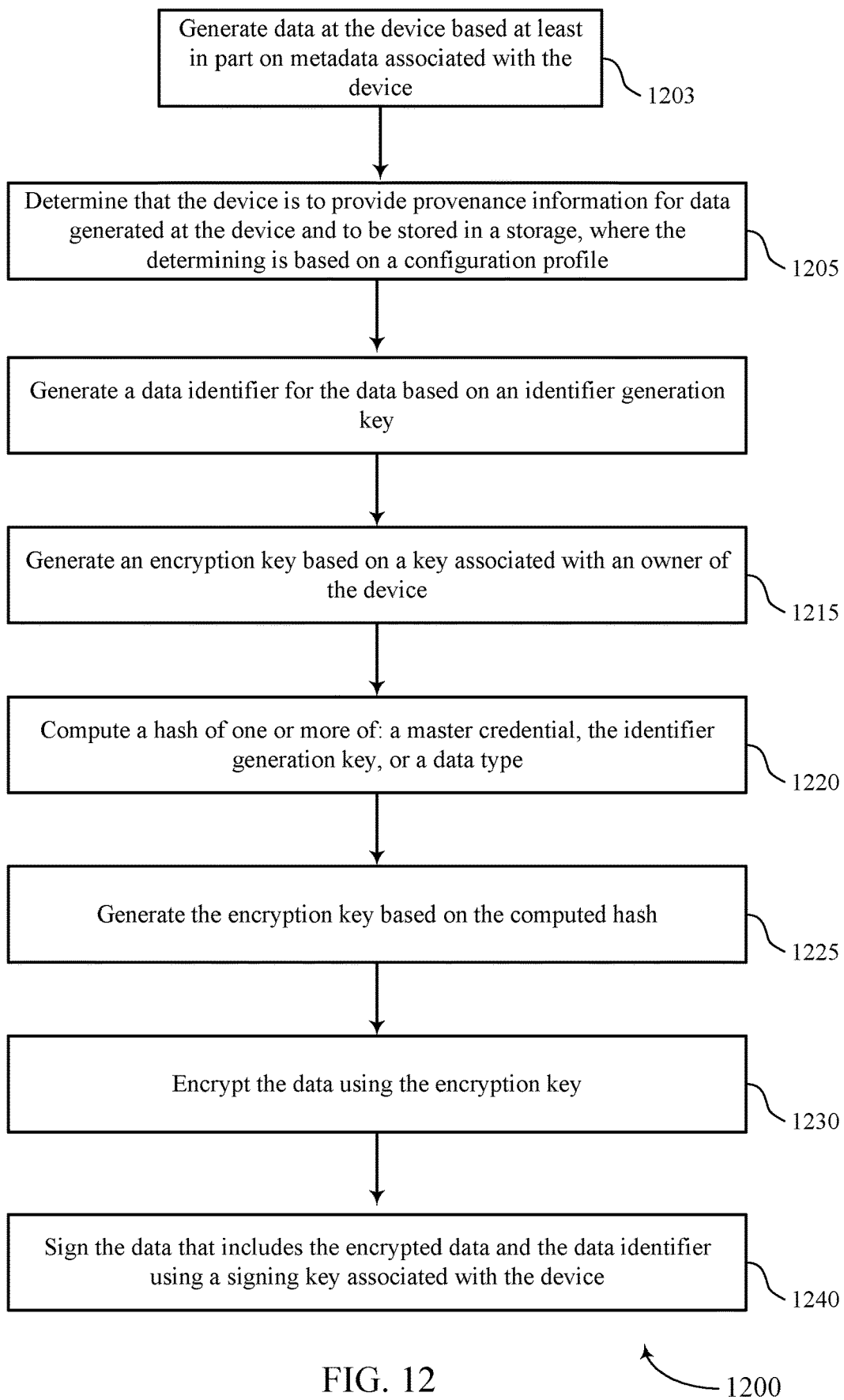

FIG. 12 shows a flowchart illustrating a method 1200 that supports data provenance in accordance with aspects of the present disclosure. The operations of method 1200 may be implemented by a UE 415 or its components as described herein. For example, the operations of method 1200 may be performed by a data configuration manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1203, the UE may generate data at the device based at least in part on metadata associated with the device. The operations of 1203 may be performed according to the methods described herein. In some examples, aspects of the operations of 1203 may be performed by a data management component as described with reference to FIGS. 5 through 8.

At 1205, the UE may determine that the device is to provide provenance information for data generated at the device and to be stored in a storage, where the determining is based on a configuration profile. The operations of 1205 may be performed according to the methods described herein. In some examples, aspects of the operations of 1205 may be performed by a data provenance component as described with reference to FIGS. 5 through 8.

At 1210, the UE may generate a data identifier for the data based on an identifier generation key. The operations of 1210 may be performed according to the methods described herein. In some examples, aspects of the operations of 1210 may be performed by a data management component as described with reference to FIGS. 5 through 8.

At 1215, the UE may generate an encryption key based on a key associated with an owner of the device. The operations of 1215 may be performed according to the methods described herein. In some examples, aspects of the operations of 1215 may be performed by a data security component as described with reference to FIGS. 5 through 8.

At 1220, the UE may compute a hash of one or more of: a master credential, the identifier generation key, or a data type. The operations of 1220 may be performed according to the methods described herein. In some examples, aspects of the operations of 1220 may be performed by a data security component as described with reference to FIGS. 5 through 8.

At 1225, the UE may generate the encryption key based on the computed hash. The operations of 1225 may be performed according to the methods described herein. In some examples, aspects of the operations of 1225 may be performed by a data security component as described with reference to FIGS. 5 through 8.

At 1230, the UE may encrypt the data using the encryption key. The operations of 1230 may be performed according to the methods described herein. In some examples, aspects of the operations of 1230 may be performed by a data security component as described with reference to FIGS. 5 through 8.

At 1240, the UE may sign the data that includes the encrypted data and the data identifier using a signing key associated with the device. The operations of 1240 may be performed according to the methods described herein. In some examples, aspects of the operations of 1240 may be performed by a data security component as described with reference to FIGS. 5 through 8.

Figure 13:
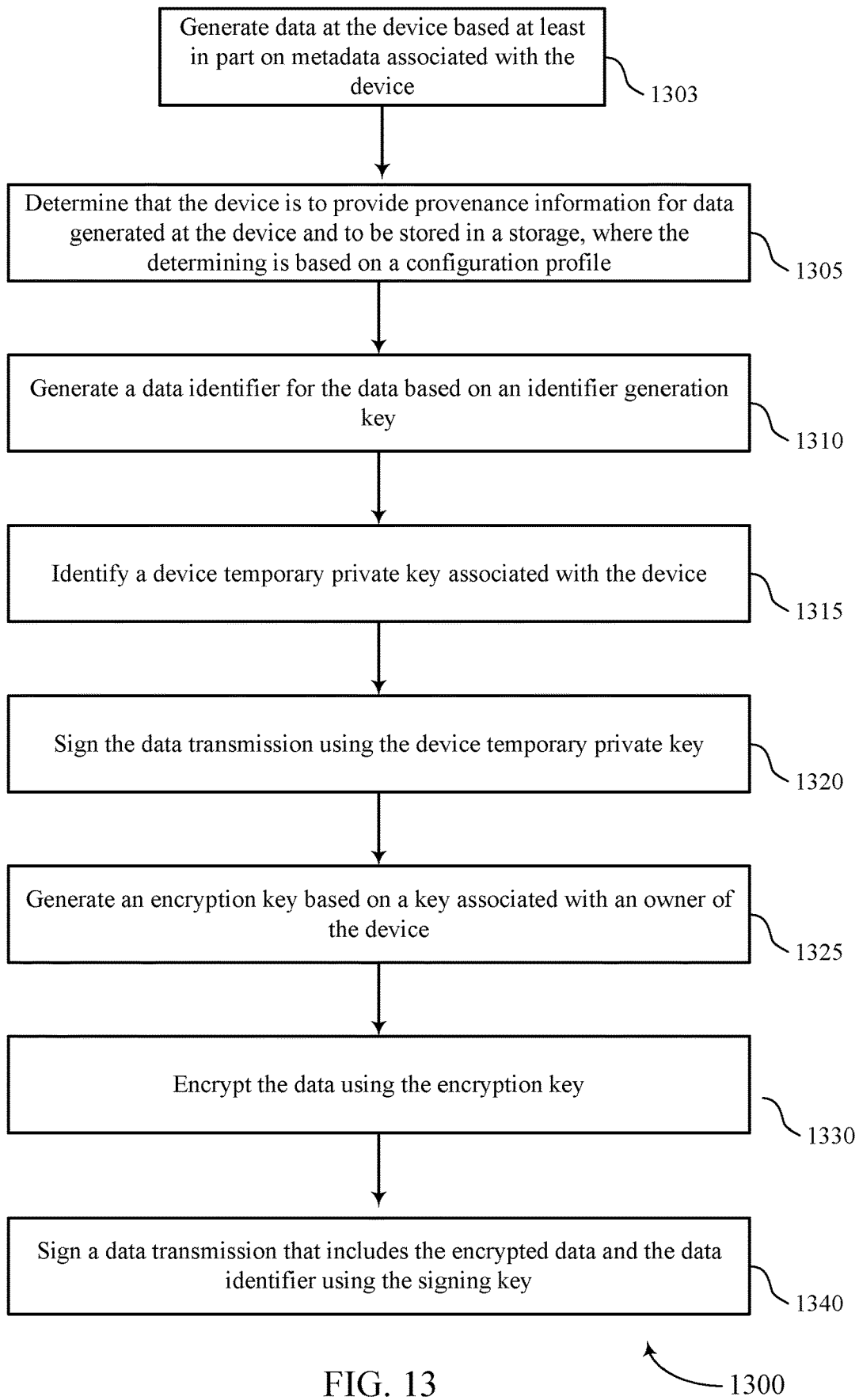

FIG. 13 shows a flowchart illustrating a method 1300 that supports data provenance in accordance with aspects of the present disclosure. The operations of method 1300 may be implemented by a UE 415 or its components as described herein. For example, the operations of method 1300 may be performed by a data configuration manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1303, the UE may generate data at the device based at least in part on metadata associated with the device. The operations of 1303 may be performed according to the methods described herein. In some examples, aspects of the operations of 1303 may be performed by a data management component as described with reference to FIGS. 5 through 8.

At 1305, the UE may determine that the device is to provide provenance information for data generated at the device and to be stored in a storage, where the determining is based on a configuration profile. The operations of 1305 may be performed according to the methods described herein. In some examples, aspects of the operations of 1305 may be performed by a data provenance component as described with reference to FIGS. 5 through 8.

At 1308, the UE may generate data at the device based at least in part on metadata associated with the device. The operations of 1308 may be performed according to the methods described herein. In some examples, aspects of the operations of 1308 may be performed by a data management component as described with reference to FIGS. 5 through 8.

At 1310, the UE may generate a data identifier for the data based on an identifier generation key. The operations of 1310 may be performed according to the methods described herein. In some examples, aspects of the operations of 1310 may be performed by a data management component as described with reference to FIGS. 5 through 8.

At 1315, the UE may identify a device temporary private key associated with the device. The operations of 1315 may be performed according to the methods described herein. In some examples, aspects of the operations of 1315 may be performed by a data management component as described with reference to FIGS. 5 through 8.

At 1320, the UE may sign the data transmission using the device temporary private key. The operations of 1320 may be performed according to the methods described herein. In some examples, aspects of the operations of 1320 may be performed by a data management component as described with reference to FIGS. 5 through 8.

At 1325, the UE may generate an encryption key based on a key associated with an owner of the device. The operations of 1325 may be performed according to the methods described herein. In some examples, aspects of the operations of 1325 may be performed by a data security component as described with reference to FIGS. 5 through 8.

At 1330, the UE may encrypt the data using the encryption key. The operations of 1330 may be performed according to the methods described herein. In some examples, aspects of the operations of 1330 may be performed by a data security component as described with reference to FIGS. 5 through 8.

At 1340, the UE may sign the data that includes the encrypted data and the data identifier using a signing key associated with the device. The operations of 1340 may be performed according to the methods described herein. In some examples, aspects of the operations of 1340 may be performed by a data security component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication at a device, comprising:
generating data at the device based at least in part on metadata associated with the device;
determining that the device is to provide provenance information for the data generated at the device and to be stored in a storage, wherein the determining is based at least in part on a configuration profile;
generating a data identifier for the data based at least in part on an identifier generation key, wherein the identifier generation key is a private key stored at the device;
generating an encryption key based at least in part on a key associated with an owner of the device, wherein the encryption key and the key associated with the owner of the device are different than the identifier generation key;
encrypting the data using the encryption key; and
signing a data transmission that includes the encrypted data and the data identifier using a signing key associated with the device.

2. The method of claim 1, further comprising:
receiving a device configuration profile comprising a data generation policy, wherein the data is generated at the device based as least in part on the data generation policy.

3. The method of claim 2, wherein the data generation policy comprises a triggering condition for the device to obtain one or more data measurements used to generate the data.

4. The method of claim 1, further comprising:
identifying one or more of: metadata, index data, a data type or a data label associated with the data; and
generating the data identifier based at least in part on one or more of: the metadata, the index data, the data type or the data label.

5. The method of claim 4, further comprising:
computing a hash of one or more of: the identifier generation key, the metadata, the index data, the data type or the data label associated with the data; and
generating the data identifier based at least in part on the computed hash.

6. The method of claim 1, further comprising:
generating the signing key based at least in part on a provisioned permanent key for the device.

7. The method of claim 1, wherein the signing key is a provisioned permanent key for the device.

8. The method of claim 1, wherein the encryption key is a one-time key associated with the owner of the device.

9. The method of claim 1, further comprising:
generating the identifier generation key at the device based at least in part on a keyed-hash function; and
receiving a device configuration profile comprising a security policy, wherein generating the identifier generation key is based at least in part on the security policy, wherein the security policy comprising at least a service identifier, service type, service parameters and any combination thereof.

10. The method of claim 1, further comprising:
generating a second data identifier for metadata associated with the data based at least in part on the identifier generation key;
generating a second one-time encryption key based at least in part on the key associated with the owner of the device; and
encrypting the metadata using the second one-time encryption key.

11. The method of claim 10, further comprising:
signing a metadata transmission that includes the encrypted metadata and the second data identifier using the signing key; and
transmitting the data and the metadata transmission to the storage.

12. The method of claim 11, wherein the data is associated with the metadata is based at least in part on the identifier generation key.

13. The method of claim 1, further comprising:
computing a hash of one or more of: a master credential, the identifier generation key, or a data type; and
generating the encryption key based at least in part on the computed hash.

14. The method of claim 13, further comprising:
receiving a device configuration profile comprising a security policy, wherein the security policy is associated with the owner of the device; and
generating the encryption key based at least in part on the security policy.

15. The method of claim 13, wherein at least one of the master credential or the identifier generation key are private credentials associated with the key associated with the owner of the device.

16. The method of claim 1, further comprising:
performing a digital water marking procedure on the data based at least in part on encrypting the data using the encryption key.

17. The method of claim 1, further comprising:
identifying, at the device, a second data transmission associated with a first data transmission of the data, the second data transmission to be stored at the storage, wherein the second data transmission comprises a second encrypted data and second data identifier, the second data transmission signed using the signing key; and
receiving a request to verify that the second data transmission is associated with the first data transmission.

18. The method of claim 17, further comprising:
performing a zero knowledge proof (ZKP) procedure in response to receiving the request, wherein the ZKP procedure based at least in part on the identifier generation key.

19. The method of claim 18, wherein the identifier generation key remains private based at least in part on performing the ZKP procedure.

20. The method of claim 1, further comprising:
identifying a device temporary private key associated with the device; and
signing the data using the device temporary private key.

21. The method of claim 20, wherein the device temporary private key is based at least in part on a temporary device identification associated with the device.

22. The method of claim 21, wherein the temporary device identification is based at least in part on a public key associated with the device.

23. The method of claim 1, wherein signing the data comprises generating the signing key based at least in part on a hash of the data and the data identifier.

24. The method of claim 1, further comprising:
identifying, at the device, that the data and the data identifier is to be transmitted to a proxy device; and
transmitting the encrypted data and the data identifier to the proxy device.

25. The method of claim 24, further comprising:
determining, at the device, that the proxy device is a trusted device; and
transmitting unsigned encrypted data and the data identifier to be signed by the proxy device.

26. The method of claim 24, further comprising:
determining, at the device, that the proxy device is not a trusted device; and
transmitting the signed data transmission to the proxy device.

27. An apparatus for communication at a device, comprising:
a processor, memory in electronic communication with the processor; and
instructions stored in the memory and executable by the processor to cause the apparatus to:
generate data at the device based at least in part on metadata associated with the device;
determine that the device is to provide provenance information for the data generated at the device and to be stored in a storage, wherein the determining is based at least in part on a configuration profile;
generate a data identifier for the data based at least in part on an identifier generation key, wherein the identifier generation key is a private key stored at the device;
generate an encryption key based at least in part on a key associated with an owner of the device, wherein the encryption key and the key associated with the owner of the device are different than the identifier generation key;
encrypt the data using the encryption key; and
sign a data transmission that includes the encrypted data and the data identifier using a signing key associated with the device.

28. The apparatus of claim 27, wherein the apparatus comprises a wireless communication device.

29. An apparatus for communication at a device, comprising:
means for generating data at the device based at least in part on metadata associated with the device;
means for determining that the device is to provide provenance information for the data generated at the device and to be stored in a storage, wherein the determining is based at least in part on a configuration profile;
means for generating a data identifier for the data based at least in part on an identifier generation key, wherein the identifier generation key is a private key stored at the device;
means for generating an encryption key based at least in part on a key associated with an owner of the device, wherein the encryption key and the key associated with the owner of the device are different than the identifier generation key;
means for encrypting the data using the encryption key; and means for signing a data transmission that includes the encrypted data and the data identifier using a signing key associated with the device.

30. A non-transitory computer-readable medium storing code for communication at a device, the code comprising instructions executable by a processor to:
  generate data at the device based at least in part on metadata associated with the device;
  determine that the device is to provide provenance information for data generated at the device and to be stored in a storage, wherein the determining is based at least in part on a configuration profile;
  generate a data identifier for the data based at least in part on an identifier generation key, wherein the identifier generation key is a private key stored at the device;
  generate an encryption key based at least in part on a key associated with an owner of the device, wherein the encryption key and the key associated with the owner of the device are different than the identifier generation key;
  encrypt the data using the encryption key; and
  sign a data transmission that includes the encrypted data and the data identifier using a signing key associated with the device.

* * * * *